US008158950B2

(12) United States Patent
Rubenstein

(10) Patent No.: US 8,158,950 B2
(45) Date of Patent: *Apr. 17, 2012

(54) APPARATUS AND METHOD FOR DETECTION OF RADIATION

(75) Inventor: Eric P. Rubenstein, East Hartford, CT (US)

(73) Assignee: Advanced Fuel Research, Inc., East Hartford, CT (US)

( * ) Notice: Subject to any disclaimer, the term of this patent is extended or adjusted under 35 U.S.C. 154(b) by 102 days.

This patent is subject to a terminal disclaimer.

(21) Appl. No.: 12/814,258

(22) Filed: Jun. 11, 2010

(65) Prior Publication Data
US 2011/0307222 A1 Dec. 15, 2011

Related U.S. Application Data

(63) Continuation of application No. 12/123,879, filed on May 20, 2008, now Pat. No. 7,737,410, which is a continuation of application No. 11/364,027, filed on Feb. 28, 2006, now Pat. No. 7,391,028.

(60) Provisional application No. 60/656,980, filed on Feb. 28, 2005.

(51) Int. Cl.
G01T 1/00 (2006.01)

(52) U.S. Cl. .................................. 250/370.08
(58) Field of Classification Search .............. 250/370.08
See application file for complete search history.

(56) References Cited

U.S. PATENT DOCUMENTS

| 4,255,660 A | 3/1981 | Blundell et al. |
| 4,476,231 A | 10/1984 | Deindoerfer et al. |
| 4,995,396 A | 2/1991 | Inaba et al. |
| 5,117,114 A | 5/1992 | Street et al. |
| 5,301,671 A | 4/1994 | Leighton et al. |
| 5,548,123 A | 8/1996 | Perez-Mendez et al. |
| 6,448,562 B1 | 9/2002 | Seidler et al. |
| 6,749,761 B1 | 6/2004 | Andreaco et al. |
| 7,130,375 B1 | 10/2006 | Yun et al. |
| 7,151,447 B1 | 12/2006 | Willms et al. |
| 7,391,028 B1 | 6/2008 | Rubenstein |
| 7,737,410 B2 * | 6/2010 | Rubenstein .............. 250/370.08 |

(Continued)

FOREIGN PATENT DOCUMENTS

GB 2400480 A 10/2004

(Continued)

OTHER PUBLICATIONS

FAS Public Interest Report vol. 55, No. 2, 2002.

(Continued)

Primary Examiner — Constantine Hannaher
(74) Attorney, Agent, or Firm — Pepper Hamilton LLP

(57) ABSTRACT

Digital images or the charge from pixels in light sensitive semiconductor based imagers may be used to detect gamma rays and energetic particles emitted by radioactive materials. Methods may be used to identify pixel-scale artifacts introduced into digital images and video images by high energy gamma rays. Statistical tests and other comparisons on the artifacts in the images or pixels may be used to prevent false-positive detection of gamma rays. The sensitivity of the system may be used to detect radiological material at distances in excess of 50 meters. Advanced processing techniques allow for gradient searches to more accurately determine the source's location, while other acts may be used to identify the specific isotope. Coordination of different imagers and network alerts permit the system to separate non-radioactive objects from radioactive objects.

33 Claims, 16 Drawing Sheets

U.S. PATENT DOCUMENTS

| | | |
|---|---|---|
| 2006/0097171 A1 | 5/2006 | Balchunas et al. |
| 2006/0169905 A1 | 8/2006 | Wendstrand |
| 2009/0114830 A1 | 5/2009 | Rubenstein |

FOREIGN PATENT DOCUMENTS

| | | |
|---|---|---|
| WO | WO 95/14245 A | 5/1995 |
| WO | WO 02/063339 A1 | 8/2002 |
| WO | WO 2007/075181 A2 | 7/2007 |

OTHER PUBLICATIONS

Clayton et al., Figaro for IRAF, www.starlink.rl.ac.uk/Bulletin/97sep/a16.html.

Shortridge et al., BCLEAN—Automatic Removal of Bad Lines & Cosmic Rays from CCD data, www.starlink.rl.ac.uk/star/docs/sun86.htx/node325.html.

Shortridge et al., FIGARO—A General Data Reduction System Version 5.6—1 User's Guide www.starlink.rl.ac.uk/star/docs/sun86.htx/sun86.html.

Nieminen et al., "ESA's Space Radiation and Plasma Monitoring Programmes", *WRMISS Workshop*, Nov. 4, 1999, PowerPoint slides, 13 pp., http://wrmiss.org/workshops/fourth/nieminen.pdf.

Chugg et al., "A CCD Miniature Radiation Monitor", *IEEE Transactions on Nuclear Science*, Jun. 2002, 49(3):1327-1332.

\* cited by examiner

APPARATUS AND METHOD FOR DETECTION OF RADIATION

PARTIES TO A JOINT RESEARCH AGREEMENT

The United States Government may have certain rights to this invention pursuant to work funded thereby at the TRANSIT RESEARCH BOARD (TRB) OF THE NATIONAL ACADEMY OF SCIENCES under grants from IDEA Grant No. TRANSIT-42.

CROSS-REFERENCE TO RELATED APPLICATIONS

The application claims priority from U.S. Provisional Application No. 60/656,980 entitled, "APPARATUS AND METHOD FOR DETECTION OF RADIATION" filed Feb. 28, 2005, U.S. application Ser. No. 11/364,027 entitled, "APPARATUS AND METHOD FOR DETECTION OF RADIATION" filed Feb. 28, 2006, now U.S. Pat. No. 7,391,028, issued Jun. 24, 2008 and U.S. application Ser. No. 12/123,879 entitled, "APPARATUS AND METHOD FOR DETECTION OF RADIATION" filed May 20, 2008, all of which are hereby incorporated by reference in their entireties.

INCORPORATION BY REFERENCE OF MATERIAL SUBMITTED ON A COMPACT DISC

Not applicable

BACKGROUND

1. Field of Invention
Not applicable
2. Description of Related Art

The ability to detect the unauthorized transportation of radioactive materials would be facilitated by a large-scale network of radiation sensors. However, the installation of such a network of radiation sensors would be costly and delay the readiness of the system.

Radiation sensing networks are being developed in Europe in case of a nuclear power-plant accident. For example, the Real-time On-line Decision Support (RODOS) system for off-site emergency management in Europe is being planned to provide consistent and comprehensive information on present and future radiological situations, the extent, benefits and drawbacks of emergency actions and countermeasures, and methodological support for making decisions on emergency response strategies. RODOS includes geographical, meteorological and radiation propagation detection modules; it also serves as a data accumulation point for radiological and atmospheric monitoring networks. Radiation sensing data provided by networked detectors would complement and enrich the radiation database like RODOS available to security authorities and disaster recovery agencies.

The ability to detect the unauthorized transportation of radioactive materials over a wide area is pressing due to the break-up of countries having nuclear weapons and nuclear reactors. Radioisotope smuggling and black market sales of radioactive material has increased substantially in the recent past. A General Accounting Office report documents some of the International Atomic Energy Agency's (IAEA) 181 confirmed cases of illegal sales of nuclear material since 1992. Twenty of these incidents involved the transfer or attempted transfer of nuclear weapons useable material, namely Pu-239 and 20%-90% Highly Enriched Uranium (HEU). Although the most ominous risk from rogue radiological material is related to HEU's use in the construction of a nuclear bomb, HEU could also be used as the raw material for a Radiological Dispersal Device or "dirty bomb". Indeed, any radioisotope can be used in the construction of a dirty bomb. However, some radioisotopes, for example Cs-137, Sr-90, or Co-60 are more dangerous than others for this application. For example, U-235, due to its comparatively low level of gamma ray activity, is not nearly as dangerous as a comparable mass of Co-60. Dirty bombs would be economically devastating to a region due to the high expense for decontamination, clean up, and economic loss should one be detonated.

Radioactive material dispersed via the detonation of a conventional explosive would be economically devastating to the region affected. Access to non-weapons-usable nuclear material is typically easier than to HEU or Pu-239, magnifying the dirty bomb threat arising from non-weapons-usable materials. This threat is heightened by the fact that nuclear contraband is typically smuggled in quantities that rarely exceed one kilogram and that nearly all of the smuggling cases were detected due to police investigations. The clean-up costs from even this small amount of radioactive material could be tremendous. It is better to detect the illegal transport of radiological materials and interdict it at an early stage.

A need exists for detecting the illegal transportation of radioactive material. There is a need for a cost effective and wide spread network of sensors that can detect radioactive material, identify its location, and provide an alert when this type of material is detected.

BRIEF SUMMARY OF THE INVENTION

Embodiments of the present invention include a system that includes an imager with one or more pixels that are capable of interacting with high energy particles and relaying information with reference to the interaction of the high energy particle with the pixel while simultaneously obtaining an image. The system may also include at least one processor that is in communication with the imager, which is able to determine that a pixel or pixels have interacted with one or more high energy particle. The system may further include an output device that reports the presence of the high energy particle.

The imagers may be any imager containing a pixilated photon detector including charge coupled device (CCD) imagers, complementary metal oxide semiconductor (CMOS) imagers, and imagers containing silicon-germanium, germanium, silicon-on-sapphire, indium-gallium-arsenide, cadmium-mercury-telluride or gallium-arsenide substrates and the like, or combinations of these imagers. Security cameras, traffic cameras, transit cameras, hand held cameras, mobile law enforcement or traffic cameras, cell phone cameras, thermal infrared cameras, and any combination of these cameras may also be used in embodiments of the present invention. The imagers used in the current invention may be stationary or movable. In a preferred embodiment of the invention, the imagers are able to rotate about a vertical axis, or pan, and rotate about a horizontal axis, or tilt. This allows the imager to track the position of the source of radioactive source of the high energy particles.

In certain embodiments, high energy particles detected by the imager or imagers may be the product of a source of high energy particles which may be the source of nuclear decay of radioactive material. The source of high energy particles include, but are not limited to, ambient radiation, radiation from natural sources, radioactive materials, nuclear devices, dirty bombs and nuclear weapons either before or after detonation or combinations thereof. The high energy particles detected may preferably be produced from the nuclear decay of radioactive materials. The source of high energy particles may also be shielded.

The pixels of pixilated photon detector produce a signal when a high energy particle strikes the pixel, and this signal is generally stronger than that of ambient, background radiation. This signal may be a bright spot or "dot" on the image created by the imager. The processor identifies these dots. When a high energy particle strikes a pixel the charge of the pixel changes more significantly than when ambient light strikes the pixel causing a dot to form since the imager reads this change in charge as a bright spot on the image. The processor of the present invention identifies dots within the image and compares them to background. If the processor detects the dot in consecutive images, a radiation event may have occurred.

In one embodiment of the present invention, the processor is able to identify the presence of a radioactive particle as well as the source of the radioactive particle. The processor may be a computer, a video image processor, a human or any combination of these.

In another embodiment of the present invention, the imager contains a thin square of pixels. The likelihood of a high energy particle striking the thin square of pixels is at a maximum (maximum flux) when the thin square of pixels is perpendicular to the source of the high energy particles. The likelihood of a high energy particle striking the thin square of pixels decreases as the imager is panned and/or tilted away from the source or the source moves through the imagers field of view. In certain embodiments, the processor is able to perform a gradient search to determine the maximum flux by driving the movement of one or more imagers until maximum flux is reached. In yet other embodiment, several imagers perform a gradient search concurrently. The processor can then reference each imager and compare the photographic and or video images obtained from the imagers to determine the likely source of the high energy particles as the area where the images intersect. The imagers are preferably interconnected.

The movement of a source of high energy particles may also be determined over time thereby allowing the movement of the source to be followed. In a preferred embodiment of the current invention one or more imagers perform gradient searches while concurrently obtaining images of the area surrounding a radioactive source. The images and maximum flux are compared to the images and an object or objects in the images may be selected as likely containing or holding the radioactive source. The objects can be any animate or inanimate objects including for example, motor vehicles, airplanes, trains, subway cars, people, animals, buildings, vegetation, luggage, boxes, bags, handbags, briefcases, mail, and combinations thereof.

The images obtained by the imagers may contain or illustrate the movement of objects within the view of the camera. In one embodiment of the present invention, objects are mixed between images and/or imagers allowing the source of the high energy particles to be located. In a preferred embodiment, a visual determination of the source of high energy particles is made.

Output devices useful in embodiments of the present invention include an alarm system, a photographic or video image, an image on a monitor, an audible sound, a telephone call, a radio transmission or multiples or combinations of these.

In further embodiments of the present invention, the type of radioactive material or radioisotope that is producing the high energy particles can be determined. The number and energy of the high energy particles may be quantified based in the change in charge of the pixel with which the high energy particle has interacted. This quantification may be compared to a library of charge changes based on the type of radioactive material producing high energy particles and used to determine the amount and/or type of radioactive material in the source.

In certain embodiments, detection may be checked for false positive detection of radioactive material either prior to or following activation of an alarm system. These and other features, aspects, and advantages of the present invention will become better understood with regard to the following description, appended claims, and accompanying drawings.

DESCRIPTION OF DRAWINGS

FIG. 5(A) refers to "Control-1", FIG. 5(B) refers to "Control-2", FIG. 5(C) refers to "Control-3" and FIG. 5(D) refers to "Control-4".

DETAILED DESCRIPTION

Figure 1:
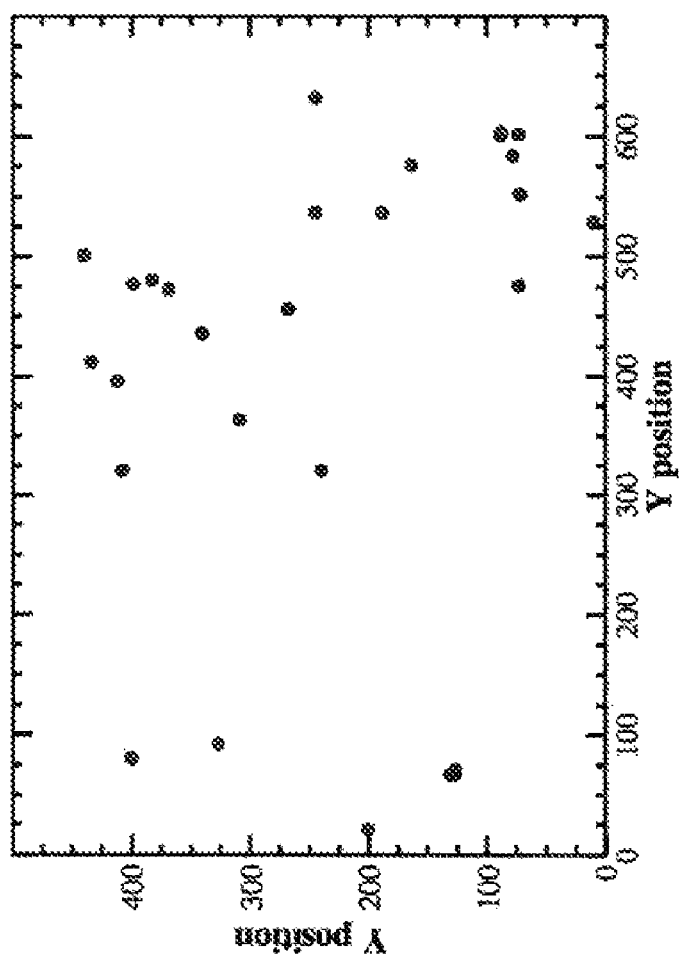
FIG. 1 depicts the pixel coordinates of gamma-ray strikes on the CCD of a test bed digital video camera. The data are summed over 15 seconds of video and represent almost two gamma-ray hits per second with only 16 µC of radioactivity, located 1.5 cm from the CCD detector.

Before the present compositions and methods are described, it is to be understood that this invention is not limited to the particular compositions, methodologies or protocols described, as these may vary. It is also to be understood that the terminology used in the description is for the purpose of describing the particular versions or embodiments only, and is not intended to limit the scope of the present compositions and methods which will be limited only by the appended claims.

It must also be noted that as used herein and in the appended claims, the singular forms "a", "an", and "the" include plural reference unless the context clearly dictates otherwise. Thus, for example, reference to a "gamma ray" is a reference to one or more gamma rays and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference. Nothing herein is to be construed as an admission that the invention is not entitled to antedate such disclosure by virtue of prior invention.

"Optional" or "optionally" means that the subsequently described event or circumstance may or may not occur, and that the description includes instances where the event occurs and instances where it does not.

Pixilated image detectors, such as charge-coupled (CCD) devices and complementary metal oxide semiconductor (CMOS) devices, may utilize a light-sensitive pixilated chip containing semiconductor material to create modern digital still and video images. While these pixilated chips have been effectively used to create conventional CCD and CMOS cameras, such chips may also be sensitive to high-energy particles and may be used as detectors for astrophysical sources of X-rays and gamma rays, digital X-ray mammography, and for high-energy physics experiments at particle accelerators.

Pixilated chips may be used in a variety of image detectors including but not limited to still or video cameras, camera phones, webcams, netcams, security cameras, traffic cameras or any combination of these. These image detectors may be easy to use, readily available, directly digitize data, interface with computers easily, have exceptional quantum efficiency, low noise and a linear response to photon energy, high energy particles and gamma rays emitted from sources of radioactive material. When a photon, gamma ray, or high energy particle strikes a pixel in the light-sensitive pixilated chip, electrons may move into the conduction band of the material providing a charge or potential proportional to the number and energy of particles incident and transparent to the pixel. Thus, higher energy photons may produce larger numbers of counts within the affected pixels allowing the processor to determine light versus shadow and the color of the light. However in the case of a high energy particle or gamma ray, static-like bright spots usually 1, 2 or 4 pixels in size may be created on the resulting image allowing for the identification of high energy particles and potentially radioactive material. Furthermore, the brightness of the spots may depend upon the energy of the particle that strikes the pixel. As such, the type of radioactive material may also be determined using devices containing light-sensitive pixilated chips.

A "pixel" refers to a detector element unit cell for converting electromagnetic radiation to signal electrons by the photoelectric effect. The generated charge may be collected and may depend upon the number of pixels and/or the amount of charge the pixels can hold. The formation of a particular well for a pixel may depend upon the dopant and concentration and that different processing techniques may be used to tailor the doping profiles to optimize a sensing operation for a particular energy of electromagnetic radiation. Substrates for pixels may be a p-type silicon substrate, however other options may also be used, such as, p on $p^-$ substrates, or p on $p^+$ substrates, SOI, BiCMOS or the like. Further, other semiconductor substrates, for example, silicon-germanium, germanium, silicon-on-sapphire, and/or gallium-arsenide substrates, among many others may be used. It should be understood that pixels may be aligned in an M×N array accessed using row and column select circuitry.

Detecting radioactive material may involve sorting through environmental monitoring data for the effects of high energy particles, neutrons, or gamma rays ($\gamma$'s) emitted from the spontaneous decay of fissionable isotopes. Nuclear decay may generally involve the ejection of an alpha particle (Helium nucleus) or beta particle (electron or positron) with energy in excess of one MeV (Million Electron Volts=1.6× $10^{-6}$ ergs). Gamma ray photons may also be emitted from the nucleus during spontaneous decay, with energy in the range of about 10 KeV to several MeV, depending on the isotope and decay mode. The measurement of each photon's energy may be performed using a variety of detector technologies.

The method for detecting the presence of signals characteristic of photons striking the pixilated detector is composed of steps. When it is determined that a statistically significant increase in signal in an image or pixel has occurred as the result of high energy particles striking the detector (e.g. 25% above normal background), for a sufficiently long amount of time (e.g. for 3 or 4 images in a row), a "radiation event" may be taking place. A radiation event may refer to an increase in the ambient level of radiation that is deemed to be in excess of normal statistical fluctuations.

If the counts or identity of an event measured by a detector is determined to be hazardous, an alert may be initiated by communicating relevant information to a network-aware layer. Optionally, advanced command, control, coordination activities may be initiated, including a gradient search to localize the source within the camera's field of view, perform triangulation from multiple cameras, and stream alert and video to designated individuals/computers. For cameras with a fixed known position, the position of the camera may be used to approximate the location of a source or radioactive material. In addition, the position of one or more fixed cameras may be included in calculations to triangulate the location of the radioactive material.

In one embodiment, in the case of two-dimensional radiation location, a computer or processor may use the information received from one or more cameras including camera location and image data to compute radiation intensity, identify a type of material identity, compute an approximate position, or any combination of these. The location of the radiation for a small source identified may be approximated from initial images and further refined or tracked with subsequent images from the cameras. The extent of a plume of radiation may be monitored based on images and counts from the cameras. Any of several different optimization procedures may be used to optimize the position of an identified radiation source. In one embodiment, the processor may first obtain a rough estimate of the object's location by a conventional method such as triangulation. Other optimization approaches may also be used. For example, a standard technique, such as an iterative progression through trial and error to converge to the maximum, may be used. Also, a gradient search may be used to optimize the position of a source. The method may be extended to three dimensions to select a point x, y, z as the best estimate of the radioactive object's location in three dimensions.

Pixilated image detectors that can produce charge carriers in response to interaction with a photon or energetic particle may be used to provide radioactive detectors. Pixilated image detector-equipped cameras have become ubiquitous for security, transit and traffic monitoring. Non-limiting examples of such image detectors may include CCD and CMOS cameras including pre-existing security or monitoring cameras that utilized these imaging processors. These detection devices may typically be networked and monitored from an operations center and, when combined with firmware or software, may be used to determine whether one or more pixels have a charge or voltage corresponding to a high energy particle or gamma ray interaction and to detect ambient radiation and radioactive materials, the amount and type of material that is emitting high energy particles and the movement of a radioactive material that is the source of the detected high energy particles.

For example, when the detector is near (e.g., less than 100 meters for energy of about 3 MeV or less) a radioactive source a corresponding increase in the rate of gamma rays striking the pixilated image detector may result. Because the level of background radiation is low (e.g., <10 counts/second per square inch), the presence of small quantities of radioactive material may be found using pixilated imagers. The charge of a pixel in an imager may be inferred from the brightness of the pixel in the image. Alternatively, the charge or voltage from the pixel during the readout process may be used directly. The imager may then relate this information to a processor that interprets the information and sounds an alarm.

In addition to sending the images and position of the CCD or CMOS imager, the imager unit may also be configured to transmit encoded information, such as the orientation of the camera, the temperature of the location, the time and the like.

In a monitoring configuration, the system or apparatus may perform continuous sampling. The system or apparatus may acquire a digital image of the environment or an object from a digital camera or digital detector. In a fast survey configuration, the system may be configured to perform non-continuous sampling from one or more images taken on demand or at longer intervals than that described elsewhere.

The sensitivity of the imager to different high energy photons may be determined using count information and calibration data from both modeling and empirical experiments. For example, an imager may be exposed to a series or known radioactive materials, such as Co-60, U-235, Bi-214 and the like, at a known distance. The charge or brightness, frequency of counts, and ratio of intensities (charge or brightness) may be determined. This information may be used to calculate the energies of gamma rays detected by the imager.

Simulations using the "MCNP" software package developed by the Diagnostics Applications Group of Los Alamos National Lab (Los Alamos National Laboratory Report, LA-10363-MS (1995)) may be used to show that the detectors and system described can provide statistically significant detections of a wide range of radioactive species. Experimental results confirming the utility of this model are illustrated in successfully detected Cobalt-60 and Cesium-137 using 1-10 µC samples as shown in FIG. 1.

Gamma rays may be emitted by radioisotopes at specific energies that are characteristic of the emitting nucleus' internal structure. A gamma ray detector able to determine the energy of individual photons may, therefore, unambiguously identify the type of nucleus that emitted the radiation. This type of spectroscopy is similar to optical spectroscopy in that the detection and identification of just a few features is sufficient to characterize the source of radiation. Whereas optical spectroscopy may often be photon starved and require the collection of numerous photons at each discrete wavelength, gamma rays have so much energy individually, that each gamma ray photon that interacts with a pixilated image detector may lead to a statistically significant data feature. The unique energy spectrum of gamma rays emitted from a radioactive material may be used to differentiate false detection from real detection.

An energy spectrum for gamma rays striking pixels in an imager may be obtained from an analysis of the image. Radioisotope identification via gamma-ray spectroscopy may involve reference library look-ups, comparisons, and decomposing a gamma spectrum into spectra from individual isotopes. The type of comparison may include the cross-correlation technique, which is a technique often used for comparing spectra having multiple lines; a variety of matching algorithms for spectral and time-series applications; Principal Component Analysis; combinations of these; or combinations that include any of these. Therefore, analysis software may be developed that measures this brightness of the spot, determines the energy spectrum of the particle and compares this information to a library spectra to allow the identification of the particular radioisotopes emitting high energy particles. The software may be used to distinguish gamma rays emitted, for example, by Co-60, as compared to Cs-137. Subsequent images may be analyzed as needed to confirm the results of the identification, or the counts or identity of the material obtained from one imager may be compared to other nearby detectors to confirm the results of the first detector. If the energy spectrum from multiple detected gamma rays matches a harmful material a warning may be issued.

More specifically, an estimate of the statistical significance of each individual gamma ray photon may be obtained by comparing its interaction with the detector with the effect that a single optical photon has on the detector. The number of electrons counted per photon may depend on both the energy of the incident photon and the instrument's gain, typically expressed as electrons per ADU (analog/digital unit). A blue-light photon having 4 eV of energy will produce, on average, 3.1 photo-electrons in a particular pixel for a Kodak KAF-1001E CCD (a particular model CCD used in high-end digital image applications). An initial estimate may be that a 200 KeV gamma ray would yield 3.1 e-/ADU*200,000 eV/4 eV=165,000 photo-electrons. However, only a portion of the gamma ray's energy may be transferred to the pixilated chip. The MCNP model simulations may suggest that the transfer of energy is significant. For example, a 766 KeV photon produced in a U-238 decay will produce ~500 photoelectrons ("counts") while a 1.001 MeV γ-ray will produce ~2000 counts. These numbers may be a lower limit of counts for detecting a gamma ray as they include energy deposition in the silicon part of the upper area of the pixilated chip. It is likely that the metal leads, SiO$_2$ covering, doping impurities or other factors may modify or enhance the transfer of energy into the pixilated chip. These counts may permit firmware or software to be used to identify the one or more pixel locations at which the high energy gamma ray was deposited based on the number of counts over a threshold. The total counts or the number of photoelectrons produced by a gamma ray, or a value proportional to this, may be based on the charge or voltage produced by the one or more pixels in the detector due to the gamma ray.

When analyzing materials which potentially emit detectable energetic particles from one or more radioactive sources, the system and methods may be used to analyze or estimate the level of radioactive sources in the material based on the amount of signal received from the CCD or CMOS detectors. Variations in the amount and type of radioactive sources, shielding, the amounts and types of material in which the emitters are present or dispersed in, the geometric distribution of emitters in a sample, versions of the system and detectors may be used to characterize these features of the source.

Simulations using the "MCNP" software package for the expected count rate arising from various shielded radioisotopes were performed and it was determined that a CCD detector may be used to monitor a large variety of radioactive materials. Contributions to source shielding are possible, and the simulations included: 1 mm lead shielding, self-attenuation within the radioactive source, two sheets of ⅛" thick steel, to represent a vehicle or a container's body panels, and a sheet of plate glass (conservative estimate of detector window) and a variable distance air-gap. The gamma ray intensity may depend upon material, type and amount, distance, geometry and shielding. Even when the absolute number of gamma rays detected is low, the individual gamma rays may achieve very high significance because of their high energy and the spectral signature of those gamma rays unique to the isotope.

It is reasonable to expect that the lower limit of precision for determining the energy of a gamma ray that interacts with the imager would be the Signal-to-Noise Ratio (SNR) of the counts for individual detections. This precision may be approximately equal to the square-root of the counts associated with individual gamma ray hits on the light-sensitive chip. The energy precision may be written as the uncertainty in energy ($\Delta E$) divided by the Energy (E), or $\Delta E/E$. For strictly Poisson statistics, $$\Delta E/E \approx (\#counts)^{1/2}/(\#counts) = 1/(\#counts)^{1/2}$$

Noise may typically result from three sources: read-out electronics, dark current, and statistical uncertainty of the source counts themselves (shot-noise). Read-out noise may be predominantly determined by the quality of the electronics. Modern pixilated image detectors and controllers typically have a very low level of noise.

Dark current may be a CCD or CMOS imager chip specific value, usually expressed as the number of electrons per pixel per second, on average, which accumulate during an "exposure" or image integration period. Dark current counts may accumulate regardless of whether light or gamma rays that are transparent to the electrodes are hitting the chip. The total of such counts may depend upon the rate and total integration time. The rate of accumulation may depend strongly on the CCD or CMOS temperature, where the rate may roughly double for each increase of 6-10° C. of the chip. The effect of dark current upon image quality, and therefore the ability to detect gamma rays with as little computational effort as possible, may be insignificant for short integration times with modern cameras in good repair. By basing the detector, for example, on a video system with a frame-rate of roughly 10 to 20 frames per second, the dark current, even when the chip is warm, may be negligible compared to the expected hundreds to thousands of counts per gamma ray. This large signal may ensure excellent counting statistics and aid in energy determination, enabling accurate identification of radioactive source despite ambient radiation in the local environment. While changes in temperature may be used to modify or detect ambient noise for a CCD or CMOS imager, unlike Ge based sensors, the CCD or CMOS detectors do not need to be cooled to detect high energy particles.

Shot-noise may generate the most significant source of noise for security cameras. Model calculations suggest that a 1 MeV photon would be expected to have an uncertainty in the energy determination of approximately $1/(2000)^{1/2}=0.022$, or 2.2%. Laboratory measurements show the measured counts for a lower-energy gamma ray photon from Cesium-137 to be about 200 counts, with an implied uncertainty of ~7% per spectroscopic feature. Since most radioisotopes that emit gamma rays have multiple energies, the unique spectral fingerprint may be preserved, even with these error estimates.

Variation in the number of gamma rays that strike the detector may be eliminated using statistical methods, and the use of more than one detector may also be used to account for these variations.

Figure 2A:
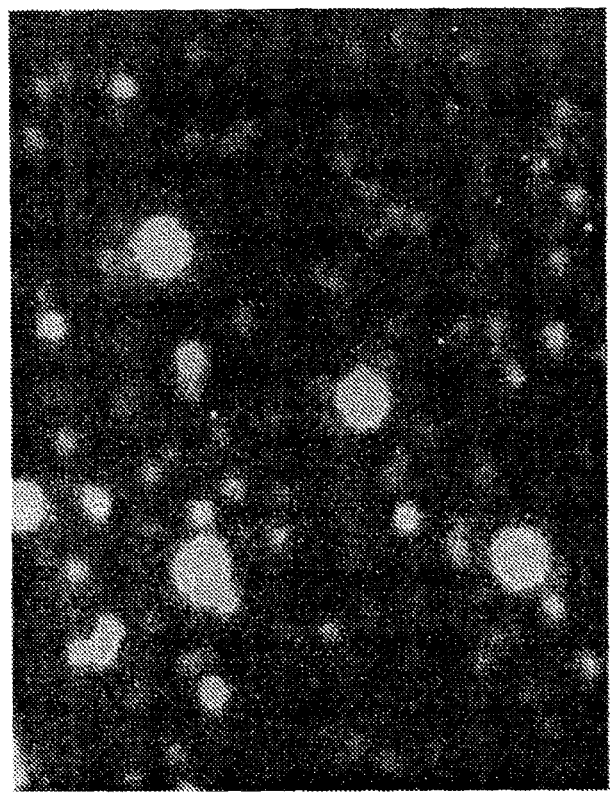
FIG. 2A shows an astronomical image from a CCD detector before analysis and identification of high energy particles in the image.
Figure 2B:
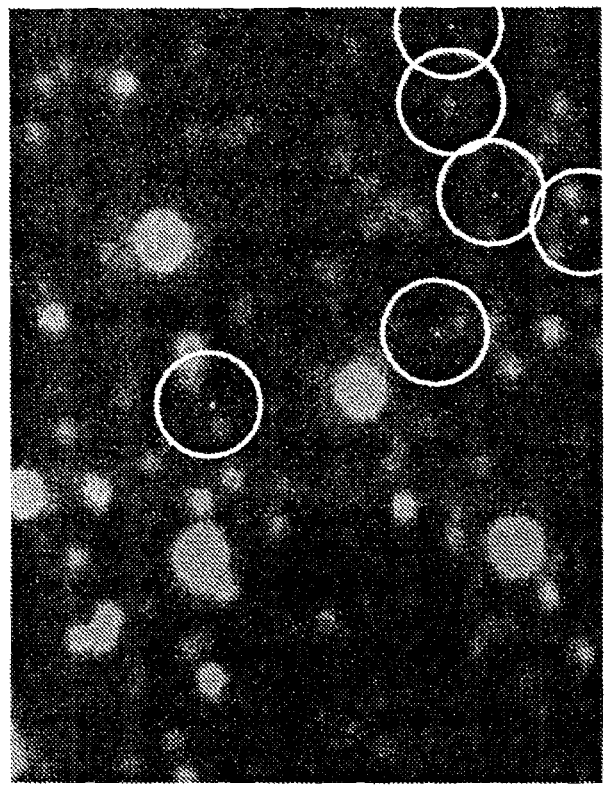
FIG. 2B illustrates the identification of signals due to high energy particles interacting with the pixels.

FIG. 2B illustrates that astronomical software or other similar software may be used to isolate, analyze and/or quantify detector signals which arise in digital image data from high-energy particles striking the light-sensitive chip. The small circled dots may result from high energy gamma rays striking the detector while the large bright spots may be stars that were the actual target for this image. It would be reasonable to expect that a source of radioactive material emitting high energy particles would produce images with spots similar to the small circled dots and may be used to detect, identify, and/or quantify the source of a known or unknown radioactive material.

Figure 3:
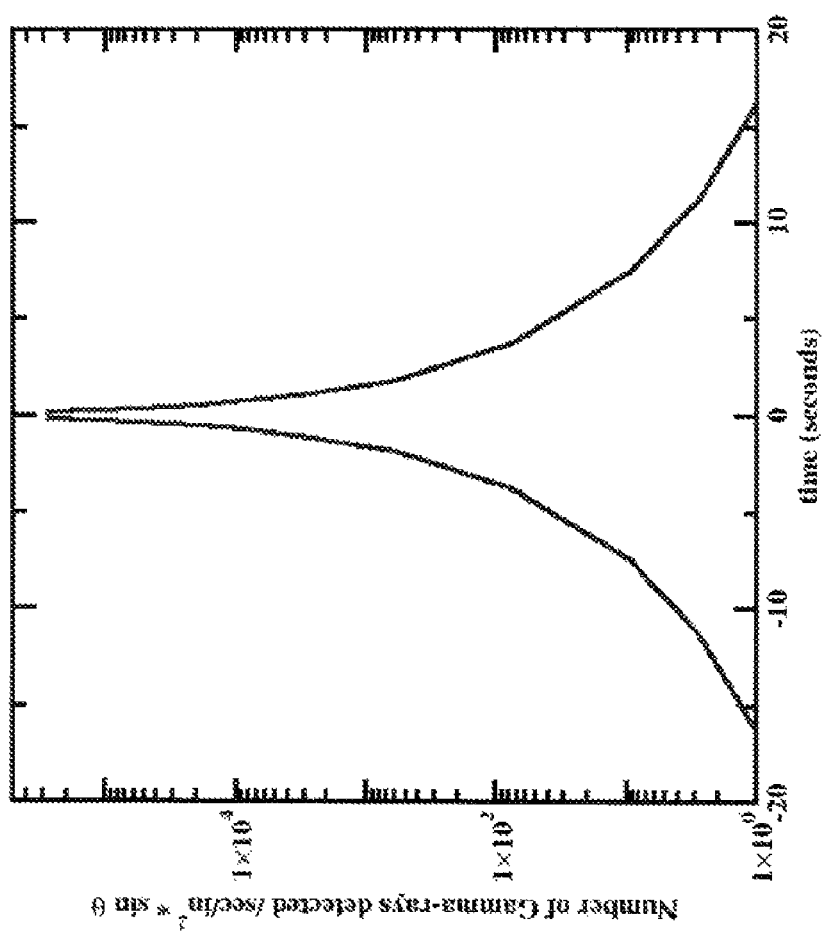
FIG. 3 illustrates the signal that would be expected to be measured for a moving source of radiation as measured using versions of the apparatus and methods disclosed.

Using one or more pixel based detectors capable of detecting and characterizing energetic particles, a moving radioactive source emitting detectable energetic particles may be observed. The light-sensitive chip within the pixilated image detector may generally be in the form of a thin square. When the thin square is positioned perpendicularly to the source of the light or high energy particles, the probability of the photon or high energy particle striking a pixel within the chip may be maximized. This phenomenon is referred to as maximum flux. The probability of a photon or high energy particle striking a pixel within the chip may decrease as the source moves through the field of view of the detector. Therefore, as the source of high energy particles moves through the field of view of a static pixilated image detector (See FIG. 3), the number of high energy particles striking the light-sensitive chip may increase over time as the source maintains a perpendicular position (time=0) in regard to the chip and may decrease until the source has left the detector's field of view (time=±20).

A pixilated image detector that is capable of moving may also be utilized to identify the source of photons or high energy particles. Movement of a detector, such as but not limited to, being panned, rotating along a vertical axis, and tilting, rotating along a horizontal axis, may be able to perform a gradient search, whereby the camera is rotated horizontally or vertically until maximum flux is determined. In this way, one or more pixilated image detectors may identify the location or track the movement of the photons or high energy particles source.

Buses, ferries, trains, patrol cars, or other transport vehicles are often outfitted with security cameras, which may be used to detect radioactivity. Such cameras may also serve as roving detectors. In an embodiment, the metal sides of the cameras may not be significantly thicker than that of cars.

Although the use of a single detector may provide important information about a radioactive material, even more information may be obtained when additional detectors are used together and their outputs are combined. Computer programs may be used to integrate the output from several detectors. One advantage of the disclosed system and methods may be networking detectors or cameras in close proximity to one another. Another advantage of the disclosed system and methods may be the ability to network existing detectors or cameras in close proximity to one another. Many different topologies of networks of monitoring stations may be used. For example, in one version, multiple monitoring stations may be established by using the existing security cameras. If a radioactive source were to be carried past these detectors, separate "radiation events" may be detected at each imager or camera. Trains, buses, passenger cars, people and/or animals with radiation emitting material moving near an imager may be expected to show a radiation profile. Similar scenarios may apply for people on a train platform, buses on the road, or vehicular traffic at a bridge/tunnel. Where multiple detectors are in proximity to one another, it may be reasonable to expect each to have a time-series response similar in shape to that shown in FIG. 3, but having different intensities or lack of symmetry, depending on the motion, speed, and position of the source with respect to the imager.

By networking the detectors, the speed and direction of the vehicle or individual carrying a material that emits high energy particles like gamma rays from a radioactive source may be determined. Although in crowded road or urban settings it may not be possible initially to uniquely identify a vehicle or person, a carrier, in possession or transporting a radioactive material, normal traffic shear and mixing may separate the carrier of radioactive material from the other vehicles and pedestrians that are initially considered potential carriers.

In general, there may be more than one object of interest (person, car, package, suitcase, etc.) in the field of view of the detector. However, when the radioactive source has traveled or been carried to the next camera, it is likely that some of the original surrounding objects (people, cars, packages, suitcases, etc) will no longer be in close proximity to the radioactive source, as illustrated in FIGS. 14(A) and FIG. 14(B). Therefore, as radiation events are picked up by sequential cameras, the identity of the specific object containing or carrying the radioactive source may become better constrained. Sequential detections by a series of cameras may help to eliminate the innocent bystanders or vehicles from those being identified as the source of the radioactive material. These sequential detections may also serve to significantly reduce or eliminate false-positive detections.

Figure 4:
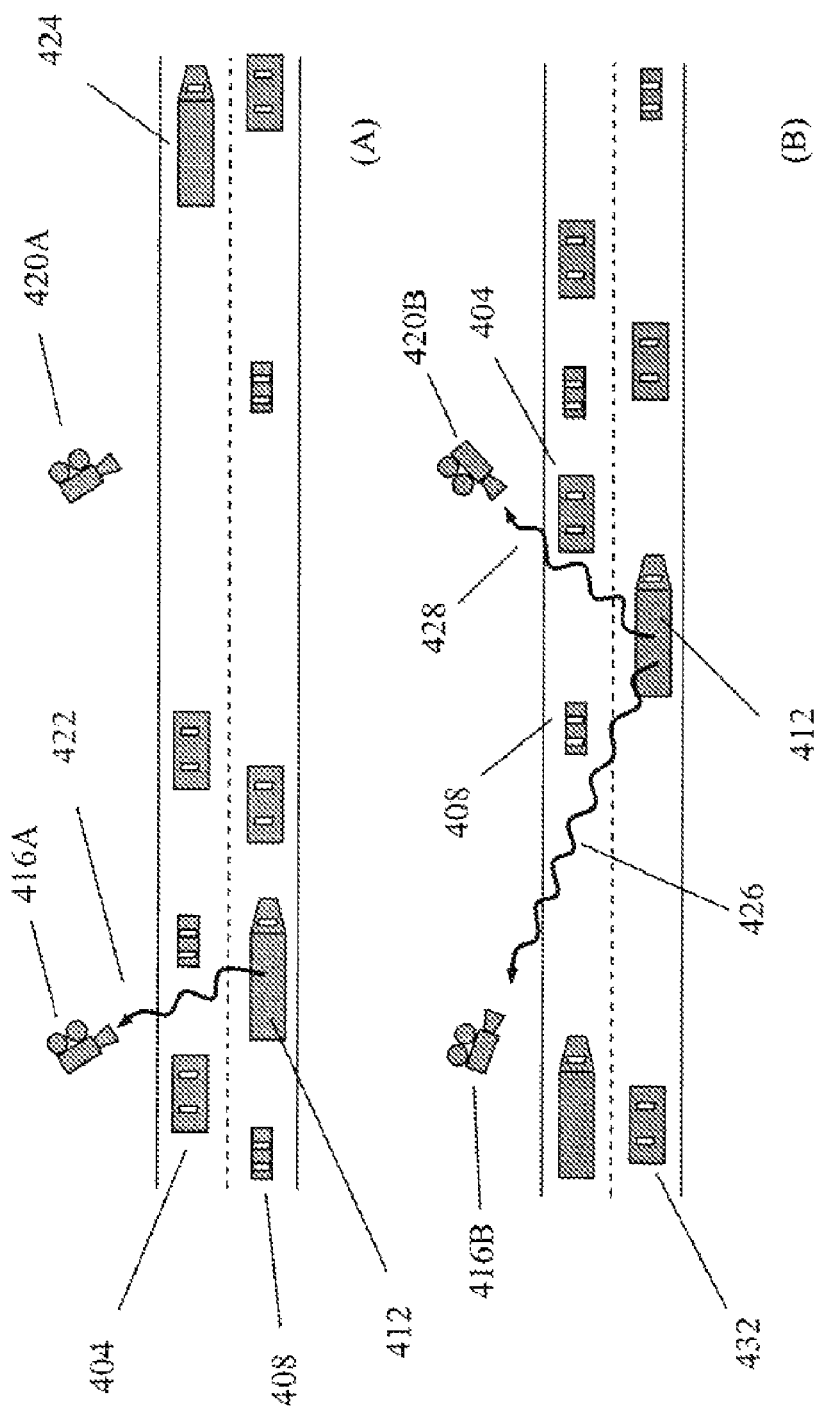
FIG. 4 illustrates how two separate detectors, for example networked CCD traffic cameras, can be used to separate radiation producing or high energy particle emitting objects from other objects which are not producing or carrying harmful radioactive material.

FIG. 4A and FIG. 4B illustrates the state of the traffic at two arbitrary time periods (A) and (B). A truck 412 may emit high energy particles 422 that are detected by CCD or CMOS detector 416A; detector 420A is illustrated not detecting high energy particles emitted by the truck source 412. The detection of high energy particles 422 by detector 416A may trigger an alert that can be used to signal detector 420A to be moved by a controller in the direction of the truck. Detector 416A may be panned in the direction of the source of the high energy particles 422 emitted by truck 412 to track the source of the high energy particles. In FIG. 4B, detectors 416B and 420B have both been moved relative to their positions in FIG. 4A. Detector 416B detects high energy particles 426 and detector 420B detects high energy particles 428 emitted by moving source 412.

In a transit environment, the importance of networked cameras is likely to yield even faster, more robust identification of a source of material or an object responsible for emitting high energy photons that can be detected. For example, typical metro stations and similar facilities are designed to have at least two security cameras able to view the entire station. Simultaneous detections by these CCD or CMOS cameras may be used to provide an important corroboration on detected radiation, increase confidence in warnings or alerts issued, and aid in making tactical decisions. Moreover, since there are radiation absorbing, concrete walls in many stations, security cameras may detect the sudden "appearance" of a radioactive source. In such a situation, it may be possible to uniquely identify the individual or source responsible for the detector signal.

The pixilated image detectors used for high energy photon energy detection may contribute to a node in a network of radiation monitoring sites. Such cameras can sample their local radiation environment. Any increase in radioactivity may be identified, verified, and communicated to the relevant emergency response center or centers. The identity of the radioisotope(s) by the system and cameras may also be communicated. If a large-scale release of radioactivity occurred, whatever the cause, functioning nodes may communicate the ambient activity level, permitting the rapid mapping and forecasting of the spread of radioactive debris. The large-scale monitoring of radioactivity and alert capability may be more wide-spread as transit or other security systems are installed, such as the Federal Highway Administration's implementation of an intelligent highway system.

The pixilated image detection system may further include alert propagation and command and control protocols. Data collected by one or more detectors may be gathered and transmitted to appropriate destinations for action or storage. Multi-jurisdictional concepts of operations for situations that cut across facility, local, state, and/or federal areas of responsibility may be facilitated in this manner. Common Internet protocols may be used to enable users to view video frames and updated alert data in real-time on standard PCs and wireless mobile handheld devices. These systems may be deployed ubiquitously with support for legacy infrastructure to ensure a reliable, secure and scalable platform.

Figure 9:
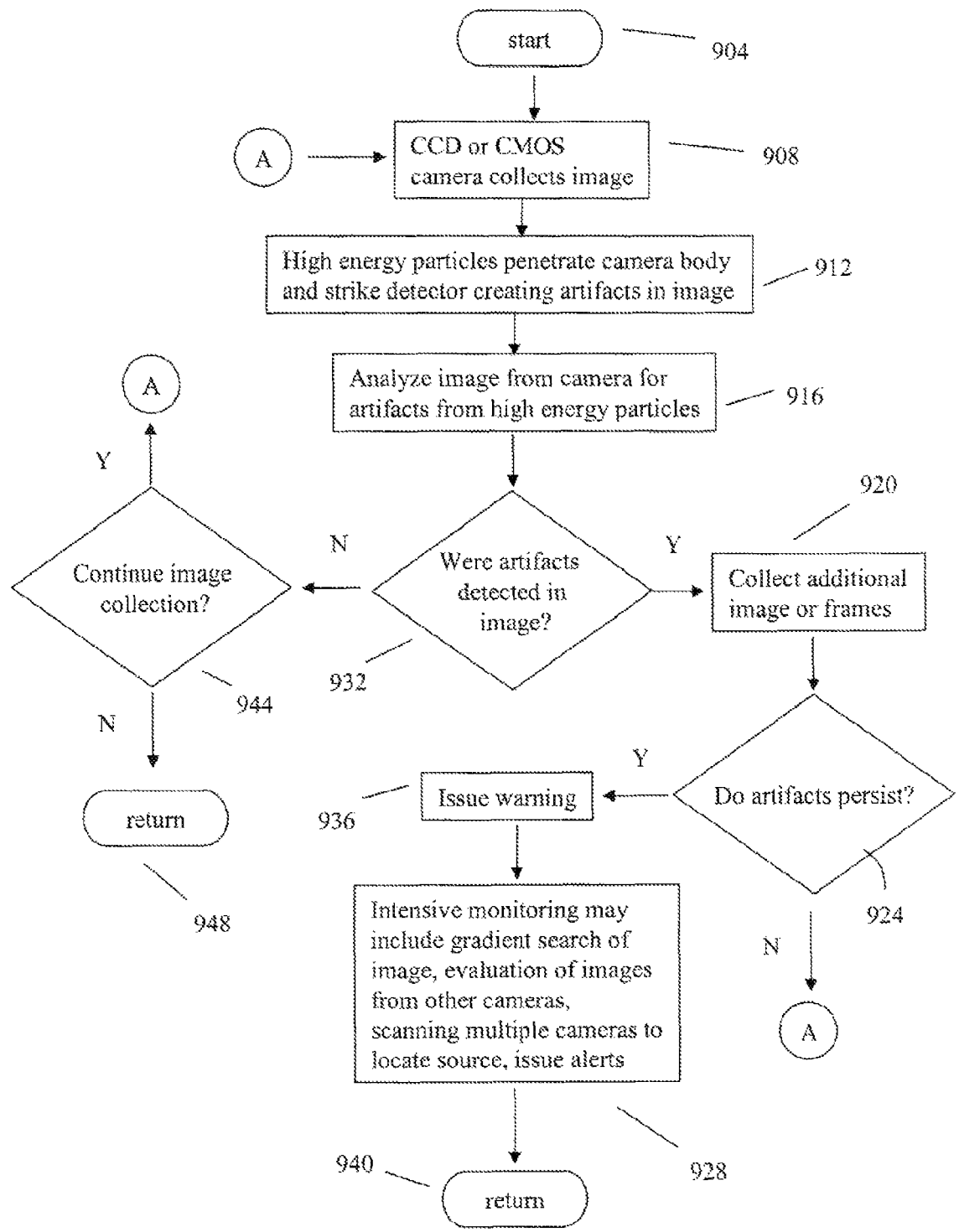
FIG. 9 depicts a flow diagram for the acquisition and analysis of images from one or more imagers capable of detecting high energy particles emitted from nuclear decay of radioactive materials according to an embodiment.

Referring to FIG. 9, a method for detecting gamma radiation is described. In step 908, a CCD or CMOS imager may collect an image of an area, volume, or combination of objects. In step 912, any high energy particles, such as gamma rays from the decay of a radioactive material, in the area imaged may strike the imager or one or more pixels in the imager creating an artifact in the image. In step 916, the image from the imager may be analyzed for artifacts from high energy particles. For example, the charge may be determined for individual pixels of the image, and/or the image may be analyzed to determine the brightness of the pixels. The image may be analyzed for objects imaged by the imager and artifacts due to gamma rays. In step 932, a determination may be made as to whether artifacts in the image from gamma rays interacting with the detector are present. If no artifacts are produced from gamma ray interaction, the routine may continue to step 944 and a determination may be made as to whether to continue image collection. If artifacts are produced from gamma ray interaction, the routine may continue with step 920 where additional images or frames of the area may be taken. In step 924, a determination may be made as to whether the artifacts persist in the image. If the artifacts do not persist, the routine may return to step 908. If artifacts persist, a warning that gamma rays were detected may be issued. In step 928, intensive monitoring may be initiated. This may include a gradient search of images that have artifacts, evaluation of images from other cameras, scanning or panning cameras, issuing additional alerts, and/or other acts to identify the source.

Figure 10:
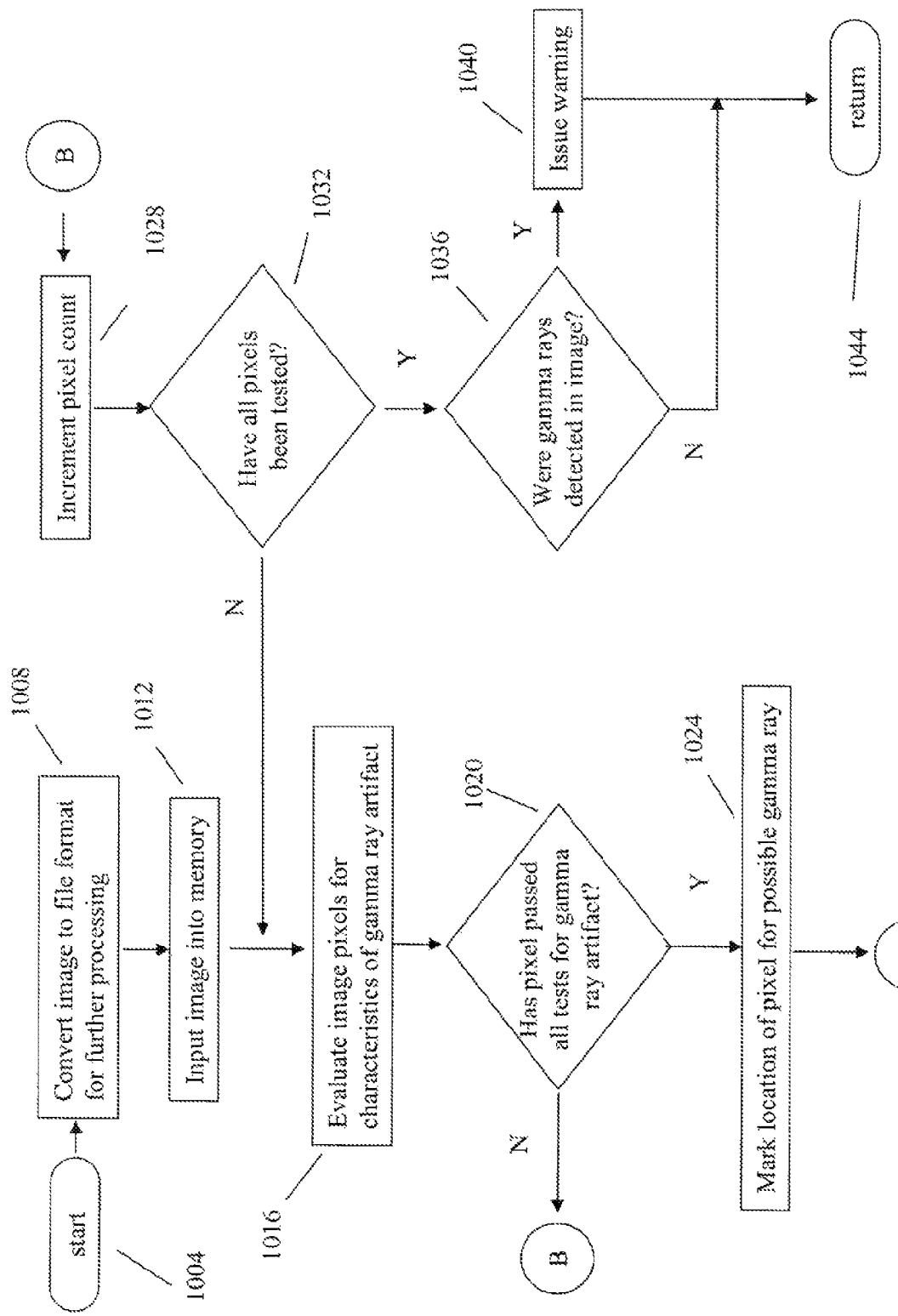
FIG. 10 depicts a flow diagram illustrating a routine for acquiring and processing images from a pixilated imager to locate evidence of gamma rays emitted by a material according to an embodiment.

FIG. 10 refers to an embodiment of a method for processing images taken by a still or video imager. In step 1008, the image from a camera may be converted to a file format for further processing and input into memory in step 1012. The image pixels may be evaluated using one or more tests and comparisons to find artifacts in the image from gamma rays in step 1016. A determination may be made in step 1020 as to whether the pixel passed all the tests that would indicate that a gamma ray was detected. If such tests are not passed, the next pixel may be evaluated. If such tests are passed, the location of the pixel may be marked or indicated and the pixel count may be increased in step 1028. The next pixel may then be evaluated. A determination as to whether all the pixels in the image have been evaluated may be performed in step 1032. If additional pixels remain to be evaluated, such pixels may be evaluated. Otherwise, a determination may be made in step 1036 as to whether any gamma rays were detected in the images. If gamma rays were detected, a warning may be issued in step 1040. Otherwise, the routine may terminate or the next image may be evaluated.

Figure 11:
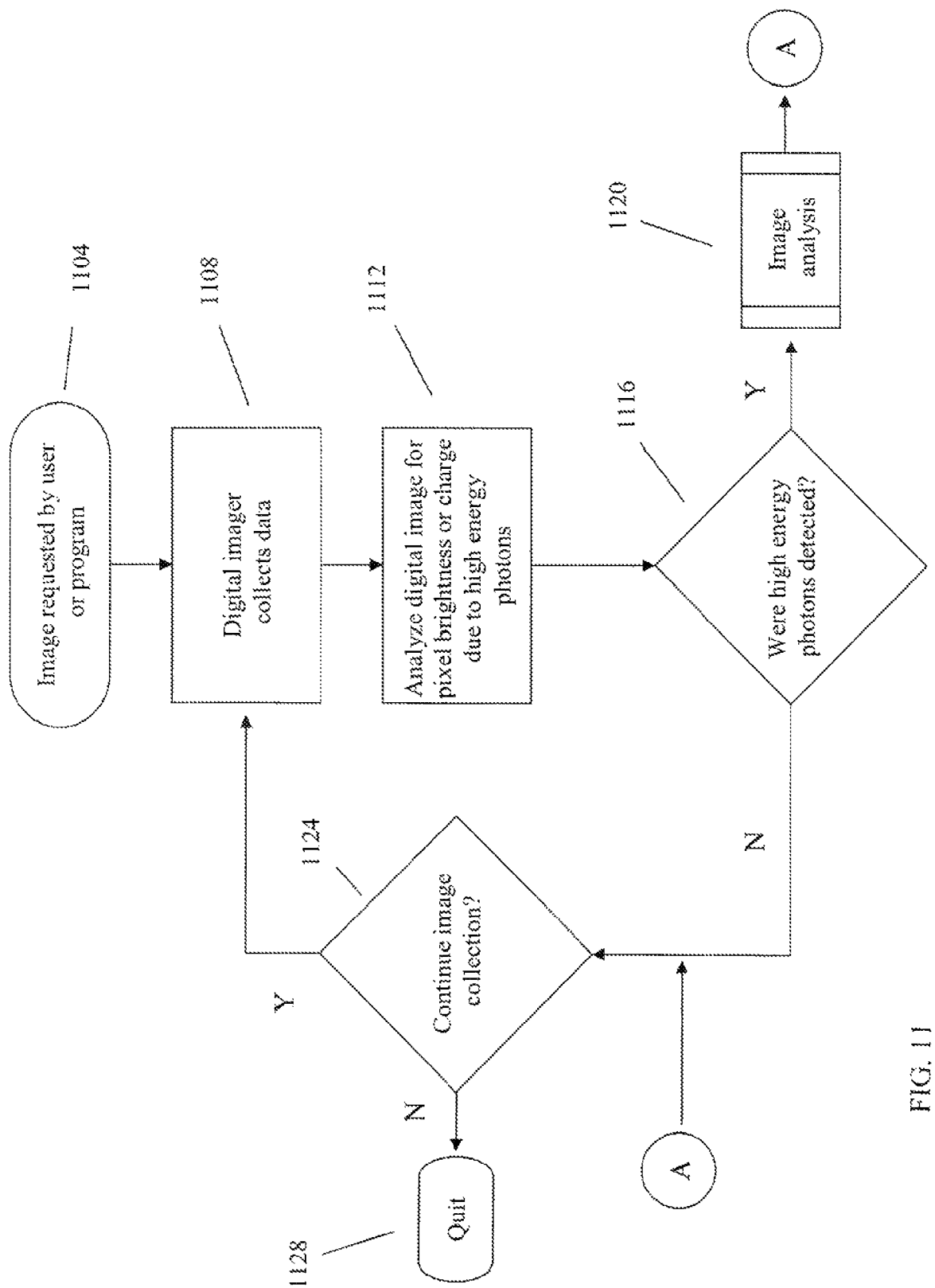
FIG. 11 depicts a flow diagram illustrating a routine for acquiring and analyzing images from a pixilated imager to locate evidence of gamma rays emitted by a material according to an embodiment.

FIG. 11 is an embodiment of a method for the detection of gamma rays using a CCD or CMOS imager. In step 1104, a user may request an image or continuous imaging of an area or objects by the imager may occur. The imager may collect data in step 1108 and analyze 1112 the image for brightness or pixel charge. A determination may be made as to whether high energy photons or gamma rays were detected in the image. If not, a determination may be made as to whether to continue acquiring images or to stop the image collection. This determination in 1124 may be continued until a user input is made to stop collecting data. If high energy photons or gamma rays are detected, further image analysis may be performed in step 1120. Once the image analysis is complete and the results returned, a determination as to whether to continue the image collection may be made in step 1124.

Figure 12:
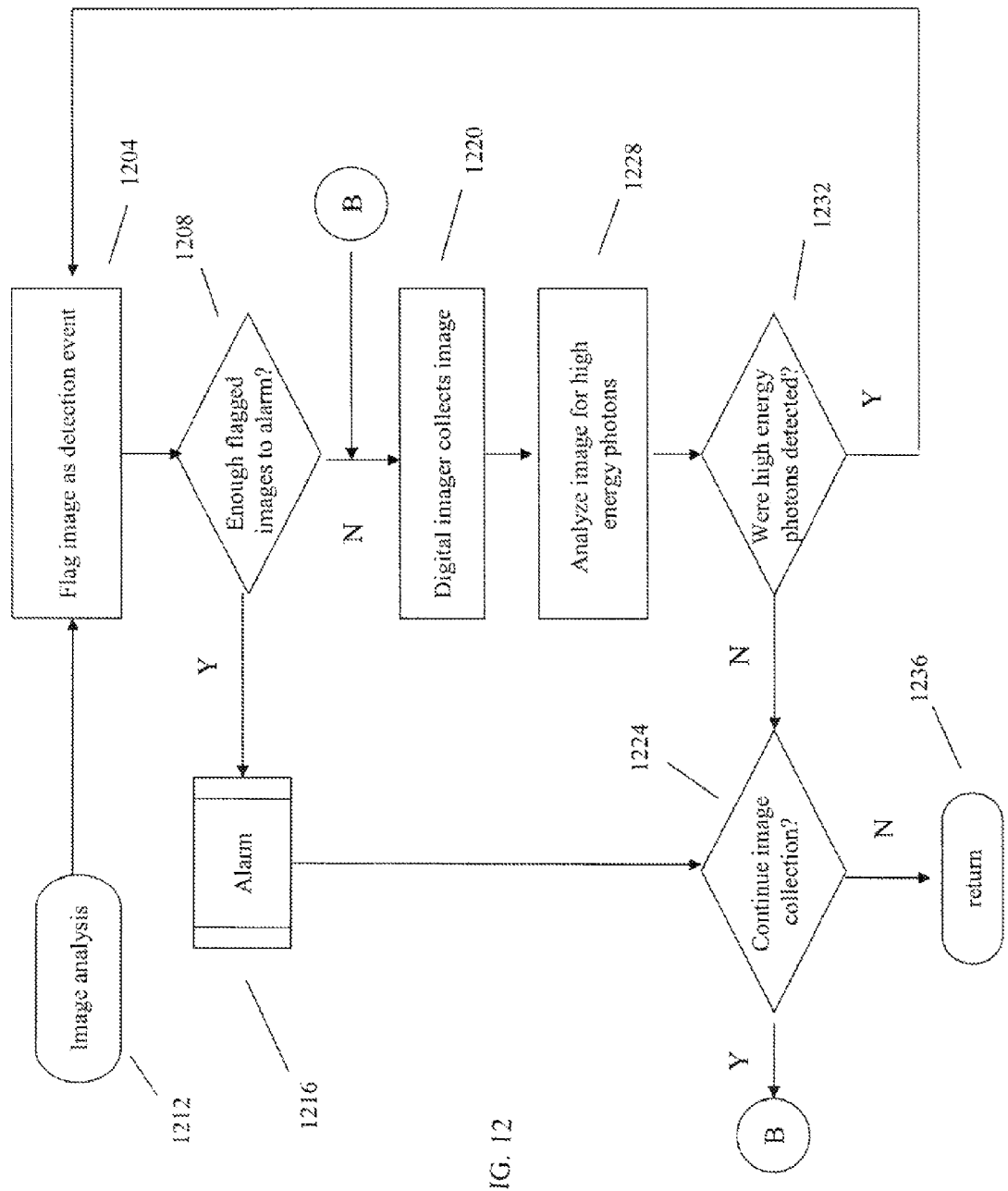
FIG. 12 depicts a flow diagram illustrating a routine for analyzing images from a pixilated imager to locate evidence of gamma rays emitted by a material according to an embodiment.

Referring to FIG. 12, an embodiment of a method for analysis of an image is illustrated. The method may include flagging the image as one where a gamma ray detection event was detected in step 1204. Next, a determination in step 1208 as to whether a sufficient number of images have been flagged for detected radiation may be made. If so, an alarm or alert may be issued. If not, the imager may be instructed in step 1220 to collect an additional image. The image may be analyzed for artifacts due to gamma rays that have interacted with the imager. In step 1232, a determination may be made as to whether gamma rays were detected in the image. If gamma rays are detected, the image may be flagged as a detection event in step 1204 and the routine may continue. If not, a determination may then be made in step 1224 as to whether to continue image collection. If so, the routine may return to step 1204.

Figure 13:
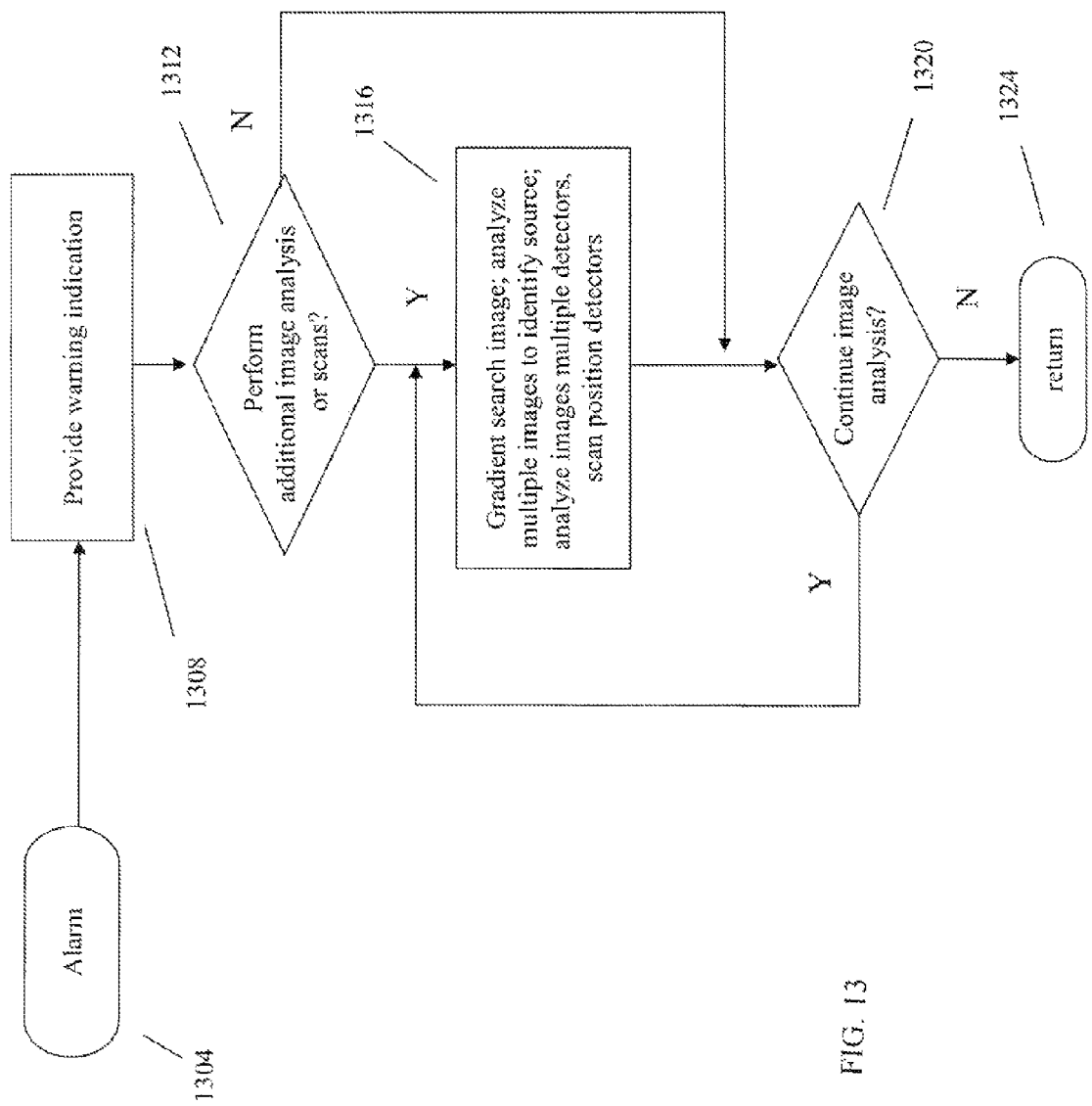
FIG. 13 depicts a flow diagram illustrating a routine for providing a warning or alarm to a user or command center and providing tracking of the source and or further analysis for determining the location, movement, or type of radiation emitting source material according to an embodiment.

An example of a method for generating an alarm or alert is illustrated in FIG. 13. Where an alarm is requested, the routine may provide a warning indication in step 1308. A determination as to whether to perform additional image analysis or scans may be made in step 1312. If additional analysis is requested, additional images may be obtained, a gradient search of the image, or analysis of multiple images to identify the source, or analysis and comparison of images from multiple detectors, or scanning a detector(s), other analysis, or a combination of these may be performed in step 1316. A determination may be made based on the analysis and results from step 1316 as to whether to continue the analysis. If so, step 1316 may be repeated and additional images and or analysis may be obtained. If not, the routine may terminate.

Figure 14:
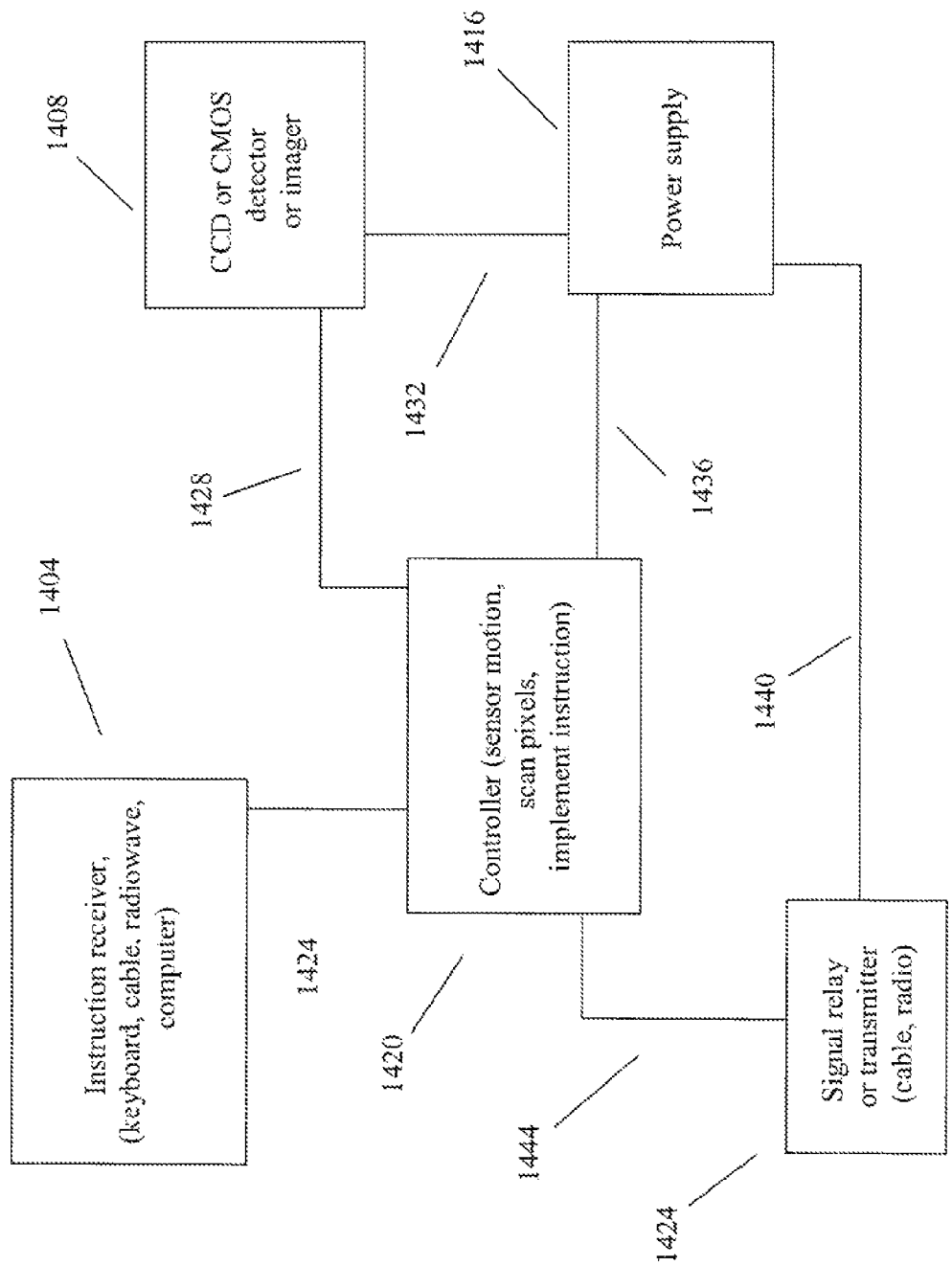
FIG. 14 illustrates a non-limiting example of an apparatus for detecting gamma rays emitted from a material utilizing a pixilated detector.

FIG. 14 illustrates a non-limiting example of an apparatus for detecting gamma rays emitted from a material utilizing a pixilated detector. The apparatus may include a controller 1420 that may receive information or images from a detector 1408, may implement instructions, and may optionally be used to control the movement or the position of the detector 1408. A receiver 1404 may be used to input instructions to the controller. The receiver may include, but is not limited to, a keyboard, cable, radio waves, or a computer. A transmitter 1424 may be used to send data, images, or instructions to another remotely located station using cables, phone lines, radio waves, or other methods of communication.

The system illustrated in FIG. 14 may include a central processing unit (CPU) 1420 having corresponding input/output ports, read-only memory (ROM) or any suitable electronic storage medium containing processor-executable instructions and calibration values, random-access memory (RAM), and a data bus of any suitable configuration. The controller may receive signals from a variety of individual pixels or from the pixilated imager or detector sensors coupled to cameras or stand alone detectors, and/or as part of a vehicle. The processing unit 1420 may be used to control the operation and/or motion of the sensors, a view taken by the sensors, and/or accept and output information to or from the sensors detectors. The controller may be connected to an input device 1404, such as a keyboard. The controller may perform data analysis or send information from detectors to a central processing unit 1404. Information from the sensors may be provided directly to a receiving station or through a transmitter 1424 in a known manner.

Figure 15:
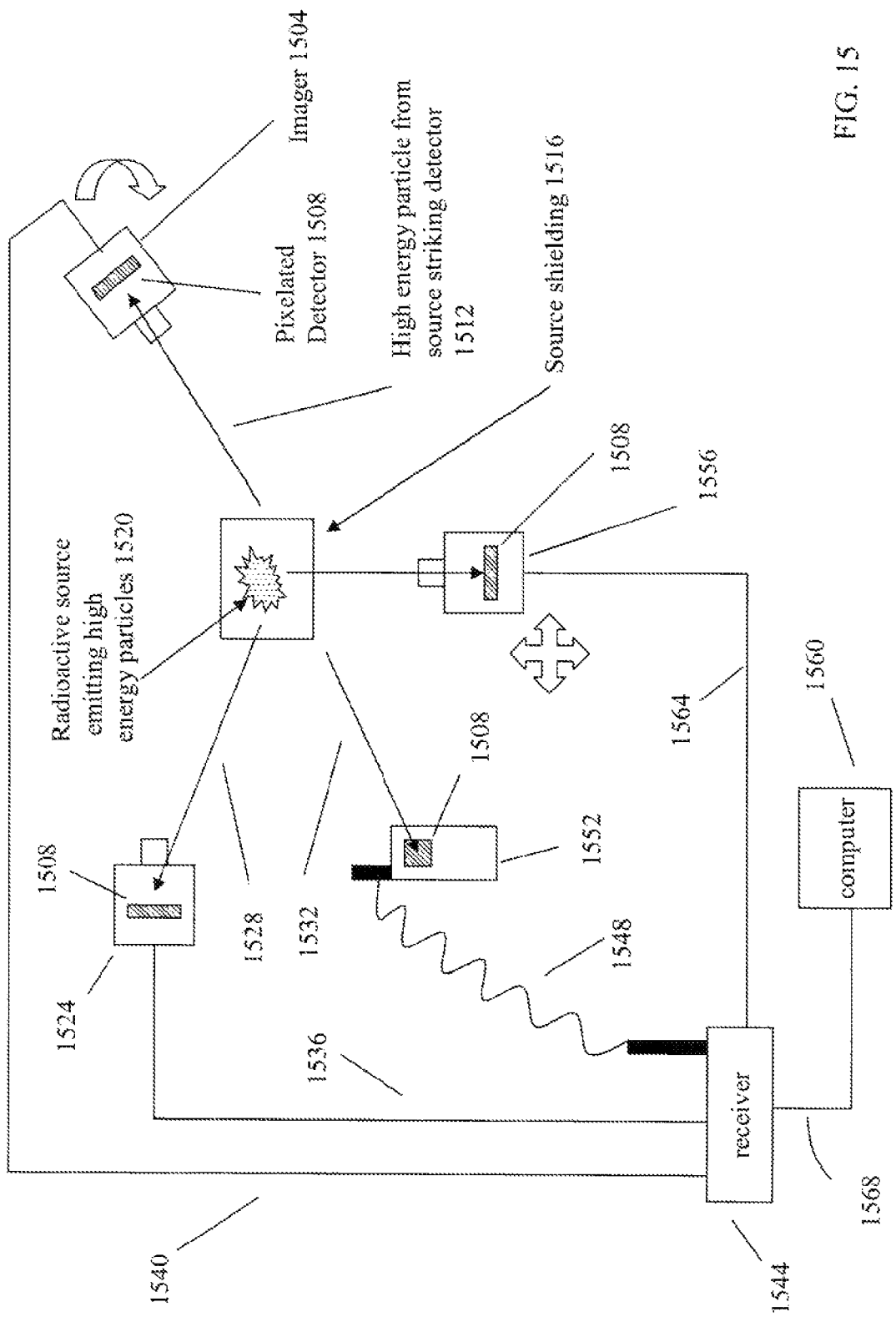
FIG. 15 schematically illustrates one or more fixed or mobile detectors, each capable of movement or translation detecting high energy photons from a radioactive material according to an embodiment.

FIG. 15 schematically illustrates one or more fixed 1524, movable 1504 and 1556, or mobile 1552 detectors, each having a CCD or CMOS detector 1508, and each capable of detecting high energy photons from a radioactive material source 1520, which may be encased in a shielding container 1516. Each of detectors 1504, 1524, 1552, and 1556 may communicate the images to a receiver by cables or telephone lines 1536, 1540, 1564 or by radio waves 1548. The receiver 1544 may be interfaced 1568 with a computer or other control and analysis system 1560.

Camera phone and other portable devices, for example 1552 in FIG. 15, may be configured for remote placement and interconnection with a network of other sensors. These devices may be solar powered and may be designed to connect to the network in the event that one or more energetic particles are detected. Portions of a network of detectors may be activated to detect energetic particles when one or more primary detectors senses energetic particles having energies within one or more predetermined energy windows or above a threshold amount. The activated network may monitor the movement of the radioactive source material.

Some radioisotopes are easier to detect than others. The calculations and examples in the disclosure are based on U-235, which compared to Co-60 is more difficult to detect, and serve as a guide to the applicability of radiation detection systems based on semiconductor materials where the counts produced by a photon incident on a pixel is proportional to the energy of the incident gamma ray produced by the source of radiation. Although the examples and calculations disclosed herein are based on U-235, the system, methods, and apparatus may be used for the detection of high energy photons from any radioactive material that undergoes nuclear decay. These CCD and CMOS imager devices have a linear response to the incident photon energy. While U-235 may be used as an example of a material that produces detectable high energy photons, the claims and disclosure are not limited to any particular radioactive material.

Instructions or programs, which may be in firmware (computer programs contained permanently in a hardware device (as a read-only memory)), EPROM, or software, may include various routines that identify radioisotopes according to the energy spectrum of the detected radioactivity. These programs may also include the capability to accept and analyze data from remote networked digital cameras, issue distributed alerts, and use network infrastructure to coordinate detections from multiple detectors. Versions of the system for detecting and identifying radioactive material with pixilated imagers may be used to form an inexpensive, dense network of radiation detectors. Such a detector network may supply continuous real-time detection and tracking of radioactive sources over a wide area and range of environments, such as highways, factories, cities, hospitals, other institutions, and other urban or rural locations.

For example, FIG. 2A shows a portion of a typical astronomical CCD image. The spots that result from high-energy particles, cosmic rays, ambient radioactive sources, and gamma rays striking the CCD during the exposure may be identified using an automatic identification program. This system may perform real time identification once the detection parameters are set. Due to the uniformity of CCD light detection characteristics, setting the detection parameters may only be performed once for a given type of camera. Once a prototype camera is set up, other systems using that specific type of detector may operate using the same settings or with only a short calibration check.

Instructions and routines in software or firmware may be used to determine the statistical significance of each peak pixel output compared to the ambient noise. The routines may begin with a scan through the image data, looking for very high count-rate pixels. The routines may further include comparing high count-rate pixel peaks to neighboring pixels using statistical tests. The statistical tests may include minimum thresholds, minimum ratios (peak to neighbor), use of detector and electronics characteristics, or combinations of tests including these. Statistical tests and programs may be used to provide detection probabilities with low false-positive outcomes. Additional checks and comparisons of the detector signal may be used to further suppress spurious alerts.

Potential sources of false-positive outcomes include background radiation, Cosmic Rays (CRs), sudden increases due to rain washing from the air naturally occurring decay products of Radon-222, Bismuth-214 and Lead-214, and the decay of Ra-222 itself. Background activity may usually be very low, as is the system noise, so detection of bona fide radioactive sources may be accomplished with a very high degree of statistical confidence. Data screening tests of information received from detectors and cameras may be used to minimize false-positive outcomes. These may include tests for appropriateness of detected spectra and persistence of the signal in multiple exposures. In addition, a vehicle or person carrying nuclear material may trigger one radiation event after another. Such a moving detection may clearly identify a bona fide source, and may not arise from background radiation, cosmic rays, or any other local radiation artifact. Finally, a large radiation release may yield distributed, persistent activity over the region affected.

In conclusion, a system and method for the detection and identification of radioactive isotopes may include an apparatus based on a semiconductor material that may obtain photographic or video images of objects and simultaneously detect high energy particles that interact with digital still and video camera imagers. The apparatus may use CCD and CMOS based images. These detector or imagers and other digital detectors of electro-magnetic radiation and charged particles, may, in addition to detecting light, detect energetic particles and high-energy photons emitted from radioactive isotopes. The images from the one or more CCD or CMOS imagers may be transferred to a computer using a frame grabber or imaging board connected by, for example, a cable or a PCI bus to a processor. Images may also be transferred using infrared data transfer, radio waves, or other electromagnetic waves used in communication devices. The images may be stored on a disk for retrieval and further analysis; the images may be stored in a compressed format. Image sequences may be captured at full or reduced frame rates. Image data from the imagers may be sent to acquisition equipment and then to the data processing equipment, including computers and other digital or analog data manipulation and analysis machinery. An analysis of image data transferred from the above components of the system may be used to detect the presence of radioactivity.

An analysis of the images from one imager may be compared to analyzed images from other nearby imagers to determine if a false-positive conclusion has occurred. Nearby cameras should be able to detect gamma rays detected by the first imager and the energies and ratio of energies detected should be similar and may be compared using statistical and logic-based tests to verify the persistence and/or consistency of the radioactivity measured. The location of hot spots or bright spots in an image due to gamma rays emitted from a terrestrial source of radioactive material may be used with the images of objects in the imager's field of view to locate the position of the radioactivity.

Various aspects of embodiments disclosed will be illustrated with reference to the following non-limiting examples. The examples below are merely representative of the work that contributes to the teaching of the present invention, and the present invention is not to be restricted by the examples that follow.

Example 1

This example illustrates the ability of an imager to detect high energy particles and illustrates the sensitivity of the detector.

The functionality and sensitivity of the various imagers to detect gamma rays (still and video) from different manufacturers were performed. In each experiment, the cameras were operated, without modifications, according to their standard directions. Exposures were alternately made with and without radioactive material near the camera body. The images taken without a nearby source served as control experiments. In general, it was expected that very few of the control experiment images should display the small pixel-scale dots caused by radiation strikes on the detector. It is also reasonable to expect some, but not necessarily all, of the images (also called frames, exposures or collectively data) to contain such artifacts.

In one series of laboratory tests, a digital video camera manufactured by Logitech, specifically, the Quickcam for Notebook Pro was used. That camera contains a 1280×960 pixel Charge-Coupled Device (CCD). In a second series of tests, an Olympus Camedia C-700 digital still camera, which contains a 1600×1200 CCD was used. Both cameras were exposed, without modifications, to small, unregulated radioactive sources. When exposed to these sources, gamma rays were successfully detected as very small, distinct white dots.

When collecting radiation sensitivity data, three radioactive sources (see Table 1): (1) 1 μC Cobalt-60, (2) 5 μC Cesium-137 and (3) 10 μC Cesium-137 were used. These sources were ordered from Spectrum Techniques, Inc. of Oak Ridge, Tenn. Spectrum Techniques provides calibrated radiation sources for experimental laboratory work. The Cobalt-60 source emits powerful 1.17 MeV and 1.33 MeV gamma rays. These energetic rays are very penetrating, with only half of such gamma rays being absorbed after traversing 11 mm of lead. Cesium-137 emits 0.66 MeV gamma rays, which are about half as penetrating as are those from Co-60. Half of Cesium-137's gamma rays penetrate 5.5 mm of lead. The fact that gamma-rays pass through significant amounts of lead shielding makes it very unlikely that radioactive sources large enough to be dangerous could be surrounded by enough shielding to avoid detection, if the system sensitivity is large enough. Preliminary results of sensitivity are discussed vide infra.

formed first with the camera surrounded by lead bricks and covered with a thick black cloth. The second series of tests were identical, except that the Cobalt-60 and the two Cesium-137 sources were placed next to the webcam. The third series of tests had the camera uncovered, aimed at the ceiling of the laboratory, with no radioactive disk nearby; the lead brick over the camera was removed, but the side bricks were still in place. The final series of tests used the same set-up as the previous series, but for the inclusion of the two Cesium-137 sources. Details concerning the first two series of tests are discussed below and summarized in Table 2.

Figure 5:
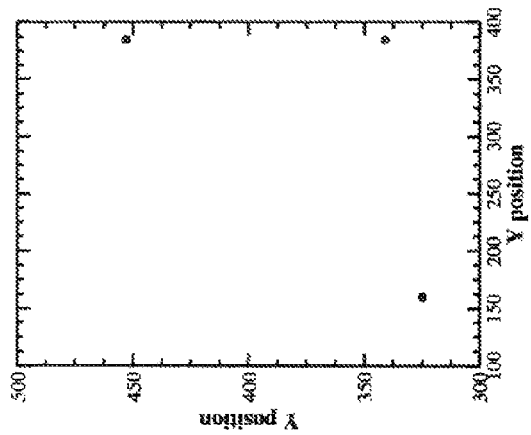
FIG. 5(A-D) depicts control experiments performed using a Logitech webcam, a CCD based device, collecting 15 seconds of video at 15 frames/s.
Figure 5:
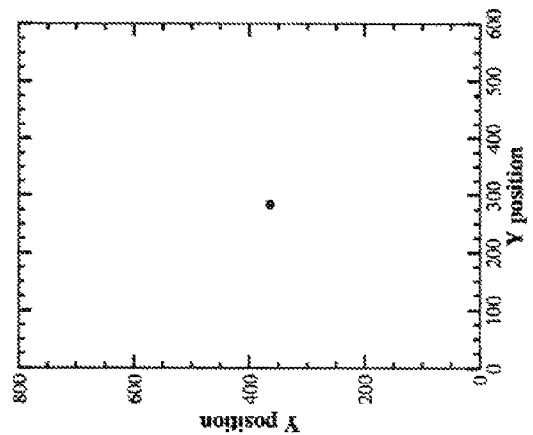
Figure 5:
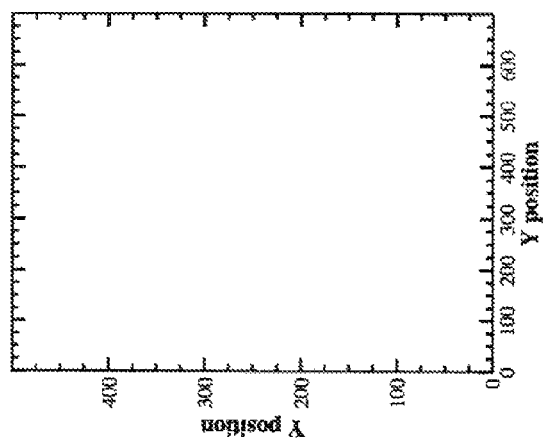
Figure 5:
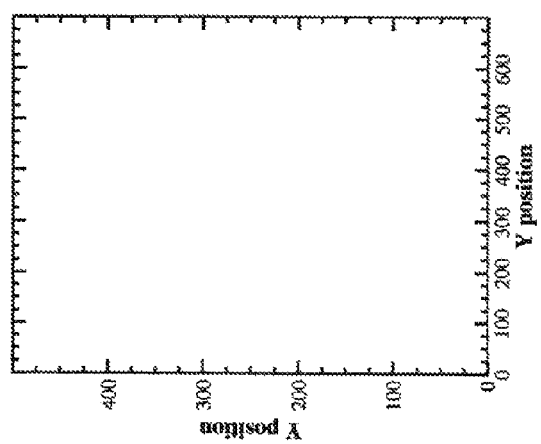

The control experiments consisted of four 15-second video clips representing 996 individual data frames, each 66.7 ms in duration. A total of four energetic particle strikes on the CCD were detected (see FIG. 5 (A-D) for pixel locations). These were presumably due to cosmic-ray impacts, or nearby radioactive decay of a naturally occurring element such as Radon or its decay products, or some other ambient source of background radiation. None of the four counts occurred closer than a few seconds to the others. This temporal gap between counts, and or a minimum count-rate, can be used as criteria to trigger an alert and also as part of a false-alarm suppression strategy.

TABLE 1

| Source Number | Radioisotope | Calibrated Activity Level per Spectrum Techniques data sheet | Nominal Decays per second | Gamma-ray energy (keV) | Beta decay energy (keV) | Lead shielding required to block half of the γ-rays | Count rate from Quantex Geiger Counter |
|---|---|---|---|---|---|---|---|
| 1 | Cobalt-60 | 1 μC | 37,000 | 1173.2 1332.5 | 317.9 | 11 mm | 700 μR |
| 2 | Cesium-137 | 5 μC | 185,000 | 32 661.6 | 511.6 1173.2 | 5.5 mm | |
| 3 | Cesium-137 | 10 μC | 370,000 | 32 661.6 | 511.6 1173.2 | 5.5 mm | |

In order to assess the ultimate sensitivity of the method, Geiger-Muller counter data were collected under as nearly identical conditions as possible to the Logitech webcam CCD data. The detector chosen was a Quartex model RD8901, manufactured by Quarta in Russia. The detector's calibration has been verified to be correct to within 10% accuracy at Brookhaven National Laboratory. The detector was positioned approximately 1.5 cm from the sources, with a 1/16th inch thick piece of acrylic plastic in between the source and detector. The plastic was used to provide nominally equivalent shielding to that of the webcam cover. Normal operation for the Quartex detector is to collect data for 31 to 33 seconds and then indicate the hourly radiation exposure level in micro-Roentgen/hour. The resulting count rate average over a 6-minute sampling period is shown in Table 1 for the Cobalt-60 sample. The other sources overloaded the detector, and no reliable count rates were obtained.

Results for system sensitivity. The Olympus camera was used just with source #1. With the 1 μC Cobalt disk lying flat against the rear side of the camera, flush against its LCD view panel, there was one (1) gamma-ray hit in one of ten 0.5 second exposures. In 44 control experiments, with no radioactive source, there was no evidence of a gamma-ray detection of the camera.

More extensive experiments with the Logitech webcam were performed than with the digital still camera. In each of the webcam experiments, data were collected for 15 seconds, at 15 frames per second, to produce movies comprised of approximately 225 frames. Control experiments were per- FIG. 6 (A-C) show three sequences of images taken while the webcam sat atop the three radioactive sources. The sequences were each 15 seconds long. This configuration detected 126 energetic particle strikes on the CCD among the 773 individual frames. The count rate varied between 1.6 counts/sec and 3.5 counts/sec.

Figure 6C:
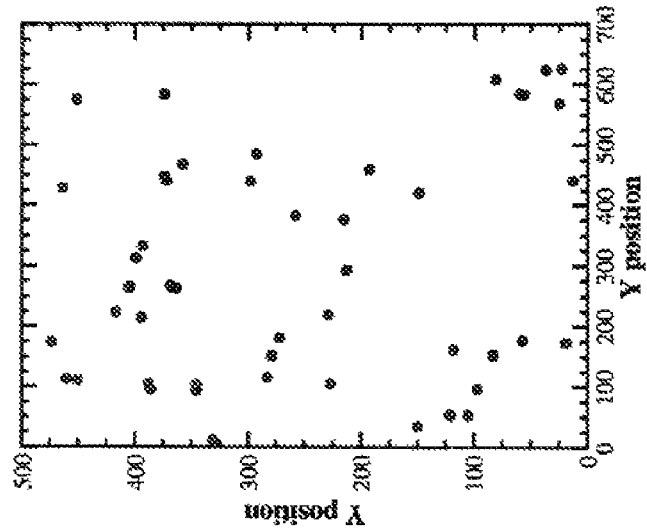
FIG. 6 (A-C) illustrates results from experiments performed with 16 µC's of radioactive source material, as described in Table 1 and Table 2.

An estimate of the statistical significance of these detections can be made to understand the value of the system as a warning device for radiation or for detection of ambient radioactivity. Consider separately the three "source" experiments having 24 counts (FIG. 6A), 49 counts (FIG. 6B) and 53 counts (FIG. 6C). The effective background radiation level was measured to be approximately one (1) count per 15 seconds of data in FIG. 5. Since radioactive decays follow Poisson distributions, and the number of counts per data set is greater than 20, some estimates of the significance of the detections using Gaussian statistics arguments may be made. The approximate 1-σ uncertainty in the measurements is the square-root of the measurement, or: 4.9, 7, and 7.3 counts, respectively for Source-1, Source-2, and Source-3. These values yield results of 24±4.9 counts/15-sec, 49±7 counts/15-sec, and 53±7.3 counts/15-sec. The first value is a few standard deviations away from the other two values, it is possible that the webcam may have slid slightly toward the sources after the first experiment; if so, a translation of ~7 mm would account for the variation observed. The significance of the detections, expressed in multiples of their respective 1-σ uncertainties, is:

significance=(value−background)/uncertainty

The resulting significance of the detection of the radioactive source for the "Source-1" experiment is $(24-1)/4.9 = 4.7\sigma$. The corresponding values for "Source-2" and "Source-3" are $6.9\sigma$ and $7.1\sigma$, respectively. In these experiments, it was known that there really was a radioactive source nearby, but that will not always be the case. It would be useful to know the likelihood for both false-negative and false-positive results. To determine the false-negative Probability of false-negative =

$$\frac{1}{\sigma\sqrt{2\pi}} \exp\left[\frac{-1}{2}\left(\frac{\text{background value} - \text{mean value}}{\sigma}\right)^2\right]$$

results, the probability that instead of recovering the expected number of counts, a number close to the background rate is found. For count rates equal to those recorded in Table 2, the probability that a statistical anomaly would produce a false-negative can be calculated by evaluating the Gaussian Probability Distribution. This can be done for a value equivalent to what would be considered normal for background, as compared to the "Total number of gamma rays detected" (called "mean value" in equation below), using the 1-$\sigma$ values. This probability is:

For Source-1, this probability is about 1 in 100,000, for Source-2 and Source-3 it is more than an order of magnitude lower. The system's sensitivity therefore makes it very robust against false-negative results, i.e., if the ambient radiation is at least as intense as the very low laboratory conditions, the count rate will be high enough to make a detection. Moreover, a radioactive source will most likely be near a detector for an extended time, or else pass by multiple detectors. Therefore, the risk of missing a source is correspondingly reduced by the number of 15 second periods spent near a detector.

To calculate the false-positive probability, the same equation would be used, except the background rate and mean value definitions are reversed, and the 1-$\sigma$ now corresponds to that of the background count rate, which is correspondingly lower. For the extremely low background rate observed, approximately 1 count per 15-seconds, the variance is ill defined from a Gaussian statistics perspective; a much longer exposure would be needed to fix it firmly. However, a rough order of magnitude estimate for the 1-$\sigma$, uncertainty would be $\pm 1$ count (the square-root of 1). Using a value of 1 for $\sigma$ means that a false-positive alert at the level of Source-1 would be a 25-$\sigma$ occurrence, i.e. a formal probability $<10^{-116}$. Additional analysis of the false-positive alert rate may be made with more extensive determination of the background rate and its variance. The low background rate also helps to ensure that real alerts are handled appropriately, not lost in measurement noise.

TABLE 2

Laboratory Results

| Experiment Series | Total source activity (µC) | # of individual video frames | Total number of gamma-rays detected | Number of frames in which gamma-rays were detected | Average counts per second |
|---|---|---|---|---|---|
| Control-1 | 0 | 224 | 0 | 0 | 0.0 |
| Control-2 | 0 | 224 | 3 | 3 | 0.2 |
| Control-3 | 0 | 225 | 0 | 0 | 0.0 |
| Control-4 | 0 | 224 | 1 | 1 | <0.1 |
| Source-1 | 16 | 225 | 24 | 20 | 1.6 |
| Source-2 | 16 | 223 | 49 | 36 | 3.3 |
| Source-3 | 16 | 225 | 53 | 41 | 3.5 |

Expected field sensitivity for imagers may be based upon scaling arguments using results of laboratory detections. The Federation of American Scientists performed a number of calculations to assess the likely impact of various dirty bomb scenarios. The results of their detailed investigations can be found on the FAS website (FAS Public Interest Report 55, N.2, 2002). One of these case studies considered the case of a 10,000 Curie source of Cobalt-60. Such a source is $10^9$ times more active than the 10 µCi Cesium source and $10^{10}$ times more active than the 1 µCi Cobalt source. In a preliminary calculation the source geometry or self-shielding were not changed. As distance between source and detector increases, the main effect is a fall-off of intensity that is proportional to the square of the distance between source and detector. The laboratory detections took place with a 1.5 cm distance. With the above assumptions, for a source $10^{10}$ times more active than our Cobalt-60 source, a comparable detection could be made when it is $(10^{10})^{1/2} \times 1.5$ cm=1500 meters away, while a source $10^9$ times more active would be detectable roughly 470 meters away. However, air-attenuation becomes important for distances greater than roughly 100 meters, at which point air becomes an important component of the shielding calculations. Since the calculated distances exceed the distance over which air-attenuation becomes important, a conservative estimate for an effective range for the detectors under these conditions would be several hundred meters, however greater ranges are possible. Alternatively, at closer separations, a stronger signal of radioactivity would be detected, or a less active source could be detected.

Example 2

This prophetic example illustrates the use of a CCD or CMOS camera or video camera to detect gamma-rays from a radioactive material.

One or more CCD or CMOS imagers may be used to sample a region or objects in the environment to determine if radioactive materials are present. An image from each of the cameras may have the charge at each pixel determined using the imager's hardware to detect pixels with high charge caused by photoelectrons generate by gamma rays. Alternatively, the image may be analyzed using software or firmware from the camera or a central processor connected to the camera to detect gamma-ray artifacts. The data signature of a gamma ray may include one or more pixels having high charge or brightness above a background or threshold level. The charge, brightness and frequency of the pixels struck by the gamma rays emitted from a source or radioactive material is expected to be greater than the charge or brightness for the same pixels interacting with ambient light or background radiation.

Software may be used to evaluate the images from an imager and conduct a series of steps to reduce/eliminate false-positive alerts. These steps may include acquiring additional images; calibrating the detector; comparison of the image and detected high energy particles with images from other nearby cameras; comparing the counts to a threshold; comparison of the identity of the energy of the gamma rays detected with a library of known radioactive isotopes to determine if a match is possible; assembling one or more images to determine if the radioactive source is moving and if the detected high energy particles correspond to the movement of the object in the image, or any combination of these acts.

Where high energy particles above a predetermined level are detected in pixels or images from the imagers, warnings or alerts may optionally be issued to system operators or others if there is a persistent, statistically significant radiation artifact or signature in one or more pixels or images that correspond to a radioactive material.

Where high energy particles above a predetermined level and/or frequency are detected, an intensive study of the images or pixels from the cameras can be performed to more precisely locate the source or radioactive material and identify its composition. Optionally, cameras detecting gamma rays may be coordinated to triangulate the radiation source location to a small volume and to improve specificity of radioisotope identification. The location and identity of the detected radioactive source may be disseminated to system operators or others in updated alerts.

Example 3

One non-limiting way of checking the pixels or image from an imager is to evaluate the four closest pixels (4 CP) in digital image data. If the pixel or image data point under consideration is (X,Y), then the 4 CP are: (X+1,Y), (X,Y+1), (X−1,Y), and (X,Y−1). The local background value of the imager can be taken as the average of the eight pixels corresponding to (X−2,Y−2), (X,Y−2), (X+2,Y−2), (X−2,Y), (X+2,Y), (X−2,Y+2), (X,Y+2), (X+2,Y+2); alternatively if a known reference object is in the field, it may be set to be the background and the average of the pixels or data points corresponding to the object set to the background.

Figure 7:
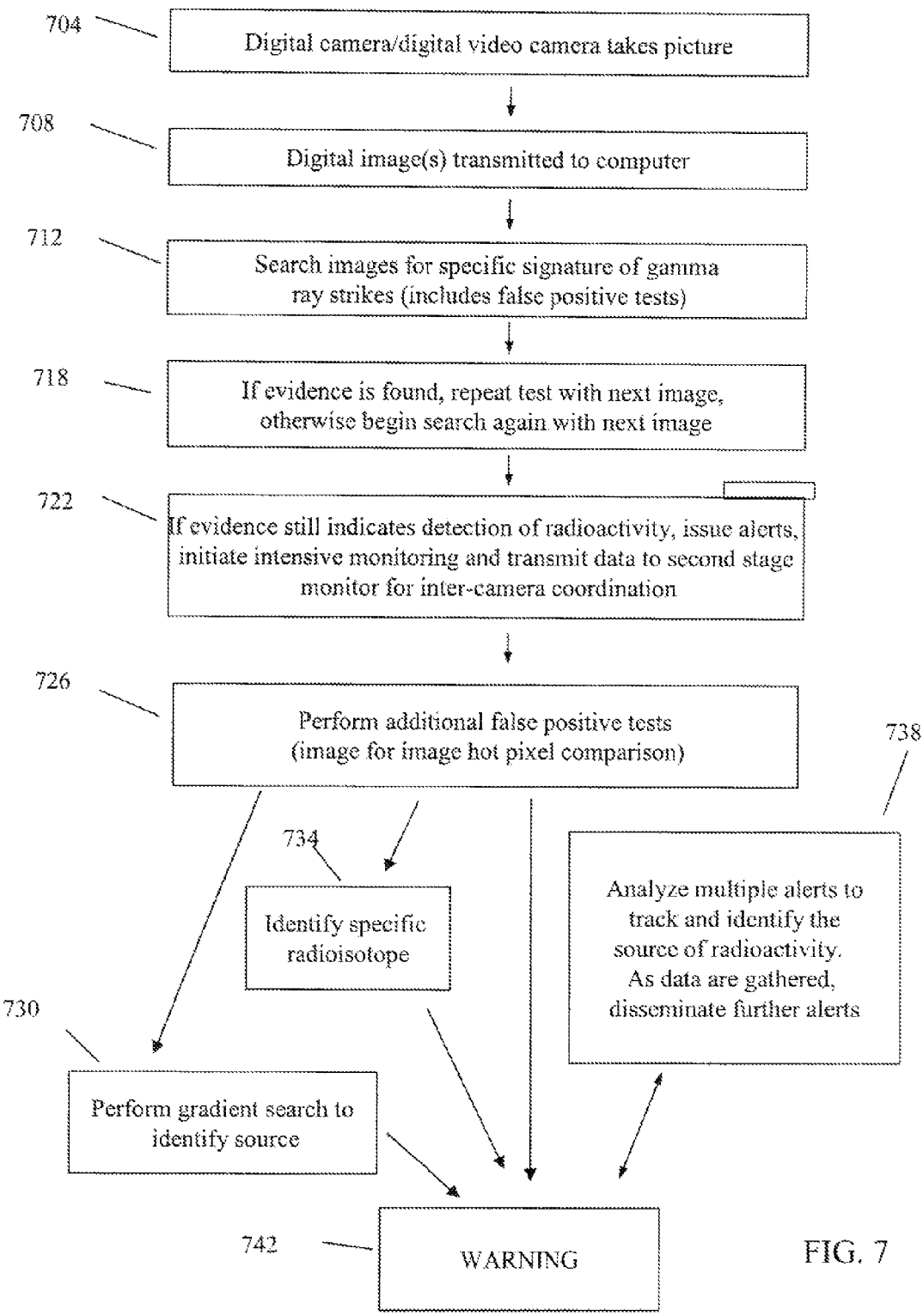
FIG. 7 illustrates a flow diagram for the acquisition and analysis of images from a pixilated detector capable of detecting high energy particles emitted from nuclear decay of radioactive materials according to an embodiment.

In one mode of operation as illustrated in FIG. 7, a digital camera/digital video camera takes a picture (704) and in another step the digital image(s) may be transmitted to computer (708). The images may be searched for specific signatures of gamma-ray strikes and may also include false positive tests (712). If evidence of a radioactive material is found, the test may be repeated with the next available image (718), otherwise begin again with the next image (718). If evidence still indicates bona fide detection of radioactivity, alerts or warnings may be issued, intensive monitoring may be initiated, and data may be transmitted to a second stage monitor for inter-camera coordination 722.

Additional false positive tests, for example image-to-image "hot pixel" comparison (726), in which it is determined if the same pixel(s) is (are) detecting high count rates image after image. "Hot pixels," if found to be a problem, may usually be calibrated by one of several common techniques.

Intensive monitoring may include performing a gradient search to identify source (730), identify specific radioisotope(s) (734), and/or issue a warning (742). Analysis of multiple alerts enables the system and operators to track and to identify the source of radioactivity (738).

Figure 8:
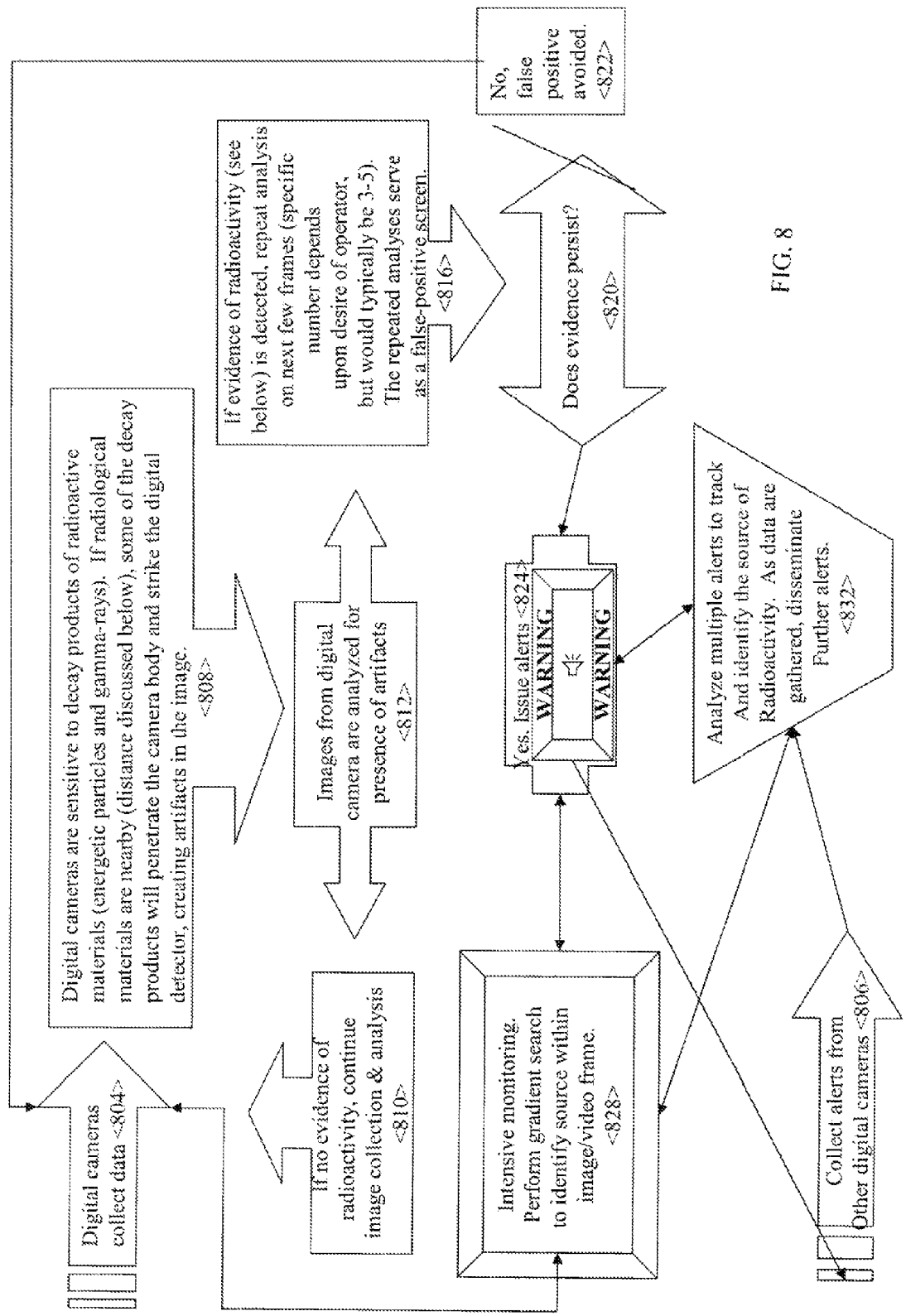
FIG. 8 illustrates the acquisition and analysis of images from one or more imagers capable of detecting high energy particles emitted from nuclear decay of radioactive materials according to an embodiment.

The functions of the software or firmware for interpreting the images from a digital camera or pixel data from an imager chip having one or more pixels are shown in FIG. 8. Data from the imager is collected 804. Digital cameras are sensitive to decay products of radioactive materials (energetic particles and gamma-rays). If radiological materials are nearby, some of the decay products may penetrate the camera body and strike the digital detector, creating artifacts in the image 808.

Images from a digital camera may be analyzed for the presence of artifacts 812. If no evidence of radioactivity is detected, image collection may continue 804. If evidence of radioactivity is detected, optionally repeat the analysis on one or more additional frames 816. The repeated analyses may serve as a false-positive screen 816. The analysis of frames may be continued until a sufficient number of frames show a radioactive material is present (evidence persists) 820, or there is no radioactive material present (evidence for radioactive material does not persist); for example the counts, image brightness, or charge on pixels of the imager are consistently below a threshold 820). Where the evidence does not persist, image collection may continue 804.

If the evidence for the presence of radiation persists, an alert or warning may be issued by the system 824. The detectors may perform intensive monitoring by a gradient search to identify a detected source, not necessarily initially within image/video frame 828. Optionally, multiple alerts may be analyzed to track and identify the source of radioactivity. As data are gathered, further alerts may be disseminated 832. This information may include alerts collected from other digital cameras 806.

In FIG. 8, digital images are collected from one or more cameras/video cameras 804. The cameras may be used for security purposes and may be networked to an operation center. These digital cameras may be used to work as radiation detectors whether or not they are utilized for video security monitoring. The detectors (e.g. CCD, CMOS, etc.) are sensitive to energetic particles from radioactive decays. Gamma rays in particular are the most likely to both reach the detector and interact with it in such a way as to be detectable. The detectors manifest this sensitivity regardless of the direction from which the gamma rays enter the camera. The physical size (e.g. in square inches) of the detector, and its angular orientation, may determine the solid angle subtended by the detector, from a radioactive source's perspective. A larger solid angle may produce a higher rate of gamma rays interacting with the detector. A radioactive source having a higher degree of activity (e.g. more decays per second) may produce a higher rate of gamma rays interacting with the detector. The data from each camera may be transmitted to a computer where the analysis is performed. The transmission may be via a cable, network, or electromagnetic radiation such as, but not limited to, radio waves. At later stages of the detection and analysis process, the results from two or more cameras may be combined to provide greater detail.

Figure 16:
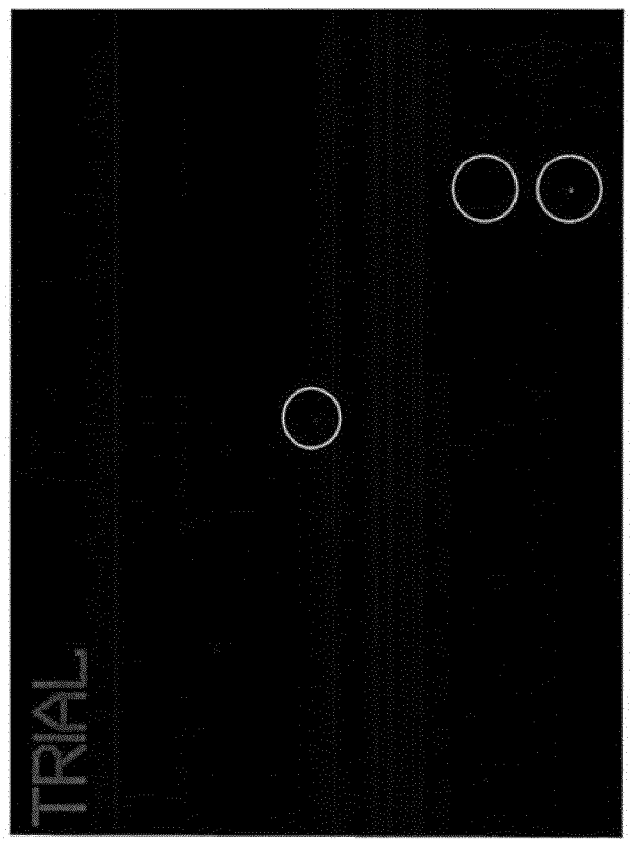
FIG. 16(A) illustrates the images from a detector without gamma ray detections, and FIG. 16(B) with gamma ray detections as white flecks (inside white circles).
Figure 16:
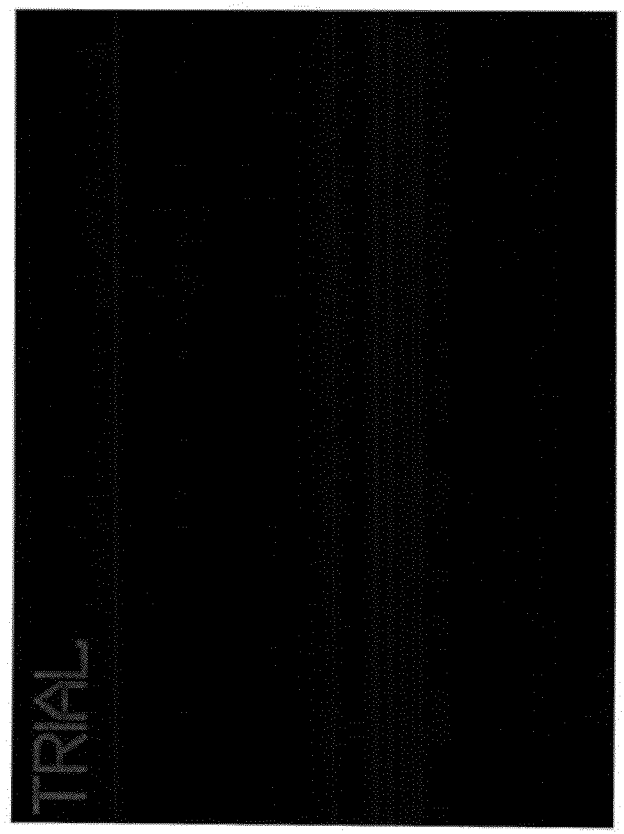

Digital cameras are sensitive to decay products of radioactive materials energetic particles and gamma-rays 808. If radiological materials are proximate, some of the decay products will penetrate the camera body and strike the digital detector, creating artifacts in the image. In images collected from the detector, the absence of gamma rays may produce images without white flecks FIG. 16 A; images or data with gamma ray detections may have white flecks FIG. 16 B.

The analysis procedure 812 may be run at specified intervals (e.g., 3 times per second), on demand (e.g., click for analysis), as fast as the camera can supply images and/or the computer or computers can analyze them, or other modes. Decisions made at steps 824, 828, and 832 may influence the mode for image selection and rate.

Each image may be converted to a file format suitable for further processing (e.g. FITS, SDF etc.). Suitable programs to transfer a file into a suitable format are known in the art and include Graphic Converter by Thorsten Lemke or other similar programs. An image may be read into memory. A search may be performed on this image to look for the white flecks produced when gamma rays hit and interact with the digital detector. A combination of algorithms may be used to detect gamma ray hits in an image. The intensity of the white flecks may be used to determine the energy of the gamma ray hits, and energy ratios for the hits may also be determined. For example, the program "BCLEAN", which is a component of the "Figaro" software package developed by Keith Shortridge, includes routines that may be used on CCD images to detect and remove bad lines and cosmic ray artifacts from an astronomical image. These routines and modifications of it may be used to detect gamma ray artifacts or hits in an image or a stored representation of an image from a CCD or CMOS imager. Rather than removing them from the image, the routines may be used to identify and characterize gamma rays that strike the imager.

In an embodiment, a variety of pixel intensity ratios may be calculated and used to identify extremely sharp-peaked image features or pixels that may correspond to gamma rays. These pixels may be flagged and evaluated by other tests.

In an embodiment, every pixel in an image may be evaluated based on a set of user or system constants. For example, $C(1)$, $C(2)$, $C(3)$ and $C(4)$ may be user defined constants (although fewer or more constants are also possible). A set of one or more tests to evaluate pixels in an image may include: determining if a pixel data value is greater than zero; determining if a pixel data value is greater than each of the four closest pixels (4 CP) in the image; determining if a pixel data value is greater than the average of the 4 CP by $C(1)$ counts; determining if a pixel data value is greater than the average of the 4 CP by $C(2)$ times that average; determining if a pixel data value is greater than the average of the 4 CP by $C(3)$ times the square root of that average; other tests may also be performed. Optionally, a shape parameter may be calculated to assess the general shape of the peak in the image. A ratio may be constructed of [(the central peak value minus the average of the 4 CP)/(the average of the 4 CP minus the local background average)]. The method may determine if this shape ratio is greater than $C(4)$.

Pixels that pass a number of these tests may be considered to be evidence of a gamma ray. For example, a pixel that has passed the first five tests, and optionally, the sixth may be considered to be a possible gamma-ray detection, and in the flow control of FIG. 8, control would flow to 816. If no pixels pass all tests, the image is deemed to be free of gamma rays; the procedure may then consider the next image 804.

If gamma rays are detected in an image 816, the method may be used to determine how many times gamma rays are detected in the next user definable period. The period may be based on a number of frames, which may be from 1 to about 1000 frames or 1 to about 15 frames, or an amount of time, which may be from about 0.5 to about 30 seconds, or from about 1 to about 10 seconds, although shorter and longer times are possible. If user detected gamma rays are present in the user definable period and the threshold is exceeded, for example 3-5 frames, the detection may be considered to be a persistent, bona fide detection, rather than transient noise.

The number of gamma rays detected per image may also be used to determine the veracity of the detection. The user can configure the system to ignore frames having fewer than some threshold number of gamma-ray detections. For example, the threshold may be 1-2 gamma-ray detections per image, but might be set higher in an area with more ambient radiation or at very high altitude. A persistent radioactive source may trigger an alert and control of the system can flow to 828, but data capture and analysis may continue. All relevant data may be logged and communicated via secure (e.g. encrypted) connection to a monitoring station for further review and possible security operations.

If the activity detected in an image does not repeat, or does not reach the threshold level, the data may be, optionally, logged, and control may be returned to standard data collection acts 804, 808, and 812.

Persistent sources of gamma rays based on pixel or image evaluation may be interpreted as a radiation event, and trigger defined alerts 824 including operator alarm, computer-based alarm, networked alerts, combinations of these and other alerts. In addition to the alerts, an intensive monitoring mode may be activated for the camera that was responsible for detecting the radiation event 828. Other cameras, for example nearby cameras, may be put into a faster data taking and analysis mode to improve the chances of detecting a radioactive source. If more than one camera detects radiation, those independent detections may be coordinated 832.

Intensive monitoring 828 may have various outcomes including verification that the radioactive source is still near an approximate location, extraction of a more precise location of the radioactive source, and identification of the specific type of radio-isotope.

Once a positive detection or radioactivity is made, subsequent analyses may update the current status, without having to revalidate the alert for persistency. These updates may be used to verify that the source is still present and may be used for the gradient search in section 828.

Some cameras may be moved by a remote operator, and/or by computer control. These cameras may be panned and tilted to alter their orientation with respect to the radioactive source. As a camera is moved to align its detector more nearly perpendicular to the source, the count rate may increase. Conversely, when the camera is aimed so as to align the detector more edge-wise to the radioactive source, the gamma ray count rate may decrease. In this way, a gradient search may be performed either by the camera operator or by a computer-controlled search (grid, raster, spiral, or other). In one implementation of the gradient search, each time the count rate goes up (averaging over a user-definable number of frames (for example 3-5 frames), a new gradient search may begin with the new maximum-count vector defining the search pattern's new origin. When a global maximum is reached, the detector may either be pointing straight towards, or directly away from the radioactive source. In many cases, the camera's position may make it extremely difficult for a source to be placed in one of these positions (e.g. on the roof of a train station, or floating in mid-air a short distance above a highway). Images of physical objects detected by the imager may be used to help determine and resolve uncertainties in source location. The digital camera data images of physical objects may be used to measure the apparent angular size of identifiable features so as to make estimates of radioactive source strength. For example, if a car is identified as the source of activity, the car's distance from the camera imager may be determined based upon its apparent angular size and its known length, height, etc. using trigonometric relationships. The calculated distance and the known sensitivity may be compared to determine if the data are self-consistent.

The energy deposited by the gamma ray in the detector may be measured in addition to determining the location within the detector and the time of detection. The amount of energy deposited into the detector increases with increasing gamma ray energy. Every radioisotope may have a unique spectrum of gamma-ray energies. Measurement of the energy deposited, plus a comparison to a library of energies may permit determination of the specific radioisotope. That identity may be reported.

Multiple cameras may detect a specific radioactive source. The data from each camera may be analyzed. Each camera may be instructed to carry out an intensive search 828 to identify the specific isotope and to perform its own gradient search. By combining the image analysis results from each camera, additional information on the source may be obtained. Images from each camera may be used to perform a gradient search. As each camera reports a most probable direction from its gradient search, these vectors may be expected to converge towards a single area. Since the different cameras are positioned in different locations, the resulting triangulation may facilitate source location determination and may help in instances where it is not possible for the data from a single camera to adequately determine a source location. The revised location for the source of radioactivity may be added to the alert information.

The coordination of detector data from various imagers may also permit a re-determination of radioisotope identity by comparing more data to the library values. A higher significance or confidence in gamma rays identified in an image may be obtained by combining analysis results from one or more cameras. The revised estimate of radioactive source properties may be reported via the alert systems.

Example 4

Figure 6B:
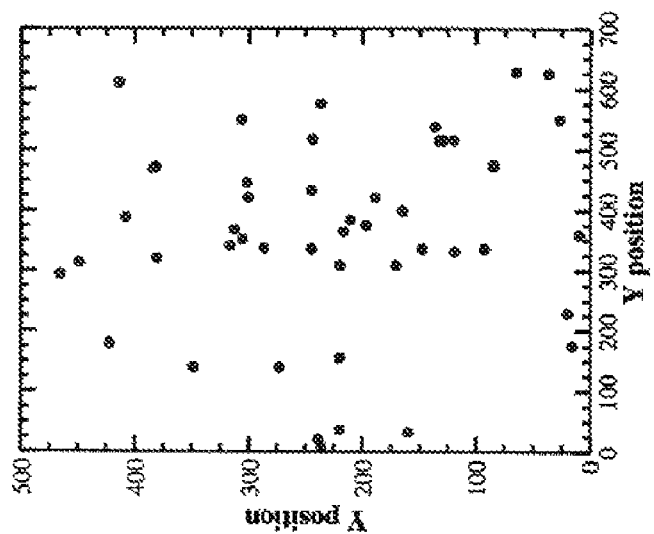
Figure 6A:
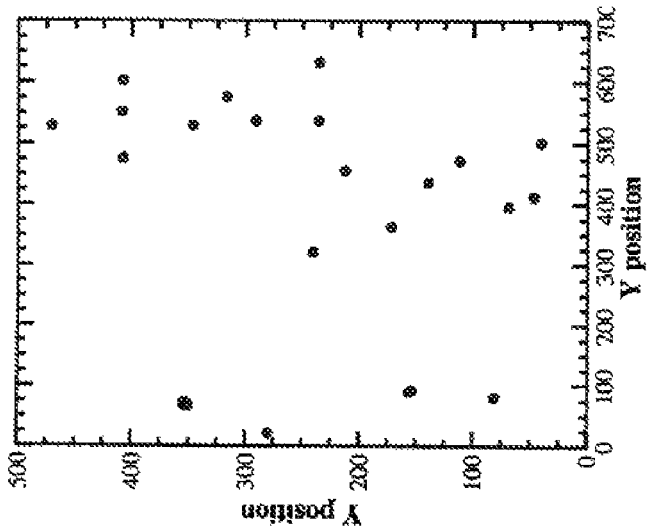

The laboratory experiments performed with small radioactive sources confirm that imagers based on CCD or CMOS platforms are sensitive to energetic particle impacts. Control experiments verify that the procedures implemented essentially eliminate false-positive alerts from occurring. For such a false alarm to happen, the background rate would have to inexplicably increase by roughly a factor of 20 to 50 and stay that way for seconds. The probability of such an outcome is vanishingly small. Similarly, the detections made in the laboratory experiments resulted in significant detections as shown in FIGS. 6A-6C, even with very low activity sources. The risk of false-negatives (missed sources) is expected to be small for radioactive sources of a size likely to represent a viable threat. Radioactive sources that have a disintegration rate of a few thousand Curies, samples large enough to present a security threat, are expected to be detectable at ranges of at least a few to several hundred meters, and possibly much further, depending upon the degree of shielding, the air-gap attenuation and the inverse-square fall-off.

The effect of geometric foreshortening reducing the projected solid angle of the detector at angles other than perpendicular to the source allow for a gradient search to be executed. This procedure allows for measurements of activity to be made across a range of pan-tilt (or altitude-azimuth) orientations. The comparison of measured levels with pointing direction provides a most probable direction vector that points along the line from the current location of the source through the camera's detector. In many installations, it would be impossible for a radioactive source to be on one of the sides of a camera, reducing the question of location to the range along a vector. This outcome would occur, for example, with a camera mounted high on a pole; the radioactive source could not reasonably be expected to be hanging in mid-air nearby. In other instances, shielding on one or more sides of the camera may be used to attenuate the gamma rays to differentiate radioactive source location. Alternatively or additionally, data from nearby cameras may be used to determine the radioactive material source location.

Example 5

Radon, a decay product of radium-226 emits an alpha particle and may emit gamma rays (Ra-219) when it decays. Lead, bismuth and thallium decay daughter nuclides of Ra-226 can emit gamma rays and may be used to determine the presence of Radon. For example, the bismuth-214 daughter nuclide of Ra-226 emits gamma rays with main energy peaks of 609 keV, 1,120 keV, and 1,764 keV gamma rays emitted by the radon decay products. A CCD or CMOS imager may be used to detect Radon and its decay products in a variety of settings. The imager may be placed in or near an area to be tested. Optionally, shielding may be used to provide a control. The data from the imager may be analyzed for high energy gamma ray particles to determine the identity and number of counts in the tested area. Alternatively, the capacitor connected to the MOSFET amplifier that converts the signal charge to voltage for the imager may be measured for charge as each pixel is read. A charge or voltage above a given threshold may be used to indicate the presence of gamma rays from a radioactive source in the area being tested.

Example 6

In one example of an imager detector, the signal generated by the detector is the result of gamma rays impinging upon silicon/silicon dioxide CCDs. A preliminary study of the gamma ray interaction and energy deposition into $Si/SiO_2$ CCD detectors was undertaken and it was found that these devices were capable of successfully detecting lead-shielded radioisotopes. Models of two different geometries, representing the extremes likely to be found in realistic field operations were studied. One model involved thin slabs of source material, minimizing gamma ray self-absorption; the other model was a spherical distribution that maximizes gamma ray self-absorption. The slab model results supported much higher detection rates, distances and confidence-levels, but even the spherical models result in detectable signals at 20-100 meter distances.

Although the present invention has been described in considerable detail with reference to certain preferred embodiments thereof, other versions are possible. Therefore, the spirit and scope of the appended claims should not be limited to the description and the preferred versions contained within this specification.

What is claimed is:

1. A system for detecting high energy particles comprising:
    at least one light sensitive pixilated chip comprising pixels configured to produce a digital still image, a digital video image or a combination thereof;
    at least one processor in communication with the at least one light sensitive pixilated chip, said at least one processor being capable of detecting one or more pixels that have interacted with at least one high energy particle and generating an output signal in response to the one or more pixels that have interacted with at least one high energy particle in real time; and
    an output device capable of reporting the at least one high energy particle.

2. The system of claim 1, wherein the at least one pixilated chip is selected from pixilated photon detector chips, charge coupled devices (CCD), complementary metal oxide semiconductors (CMOS), and silicon-germanium, germanium, silicon-on-sapphire, indium-gallium-arsenide, cadmiummercury-telluride, or gallium-arsenide substrate containing chips, and combinations thereof.

3. The system of claim 1, wherein the at least one high energy particle detected by the processor comprises the product of a source of high energy particles wherein the source of high energy particles comprises a source of nuclear decay of radioactive material.

4. The system of claim 3, wherein the source of the high energy particle is selected from ambient radiation, radiation from natural sources, radioactive materials, nuclear devices, dirty bombs and nuclear weapons either before or after detonation, and combinations thereof.

5. The system of claim 3, wherein the source is shielded.

6. The system of claim 1, wherein a signal is produced when at least one high energy particle interacts with one or more pixels of the light sensitive pixilated chip.

7. The system of claim 6, wherein the signal is proportional to the energy of high energy particles that strike the pixel.

8. The system of claim 6, wherein the signal is stronger than that of background radiation.

9. The system of claim 1, wherein the output device displays one or more dots corresponding with each of the one or more high energy particles detected.

10. The system of claim 1, wherein the at least one processor is capable of identifying a source of the at least one high energy particle.

11. The system of claim 1, wherein the system comprises a plurality of pixilated chips and wherein said plurality of pixilated chips are interconnected.

12. The system of claim 1, wherein the at least one pixilated chip is positioned to monitor objects, wherein said objects are selected from animate and inanimate objects, motor vehicles, airplanes, trains, subway cars, people, animals, buildings, vegetation, luggage, boxes, bags, handbags, briefcases, mail, and combinations thereof.

13. The system of claim 1, wherein the processor is selected from a computer, a video image processor and combinations thereof.

14. The system of claim 1, wherein the output device is selected from an alarm system; a photographic or video image; an image on a monitor; an audible sound; a telephone call, a radio transmission and combinations thereof.

15. The system of claim 1, further comprising a processor module configured to determine a number of pixels that have interacted with the at least one high energy particle and an energy of the at least one high energy particle, a type of a source of the at least one high energy particle or an amount of a source of the at least one high energy particle.

16. The system of claim 1, wherein the at least one pixilated chip is completely covered, partially covered or reversibly covered.

17. A method for detecting high energy particles comprising:
collecting data from one or more light sensitive pixilated chips comprising pixels for creating a digital still image, a digital video image or a combination thereof;
identifying from the collected data at least one pixel that has interacted with at least one high energy particle in real time; and
detecting a source of the at least one high energy particle.

18. The method of claim 17, wherein the one or more light sensitive pixilated chips are selected from the group consisting of a charge coupled device (CCD), a complementary metal oxide semiconductor (CMOS) device, and silicon-germanium, germanium, silicon-on-sapphire, indium-gallium-arsenide, cadmium-mercury-telluride, or gallium-arsenide substrate devices, and combinations thereof.

19. The method of claim 17, wherein the source of the at least one high energy particle comprises a radioactive material, radioisotope and combinations thereof.

20. The method of claim 17, further comprising quantifying a change in charge, voltage, or a combination thereof produced when the at least one pixel interacts with the at least one high energy particle.

21. The method of claim 20, further comprising quantifying an energy for the at least one high energy particle, a type of the source, an amount of the source, or combinations thereof based on the quantified change in charge.

22. The method of claim 17, further comprising determining a number of pixels that have interacted with at least one high energy particle.

23. The method of claim 17, further comprising checking for false positive detection of a high energy particle.

24. The method of claim 17, further comprising generating an alert when the at least one high energy particle is detected.

25. The method of claim 24, wherein the alert is selected from the group consisting of an audible alert, a visual alert, and a combination thereof.

26. The method of claim 17, further comprising tracking the source of the at least one high energy particle.

27. The method of claim 26, further comprising continuously moving at least one of the one or more light sensitive pixilated chips such that at least one high energy particle interacts with at least one pixel of the at least one continuously moving light sensitive pixilated chip.

28. The method of claim 26, further comprising identifying a position where at least one pixel of the at least one continuously moving light sensitive pixilated chips has a maximum probability of interacting with at least one high energy particle.

29. The method of claim 26, further comprising adjusting the at least one continuously moving light sensitive pixilated chips until the light sensitive pixilated chip is perpendicular to the source of the at least one high energy particle.

30. The method of claim 26, further comprising:
coordinating at least a first light sensitive pixilated chip and at least a second light sensitive pixilated chip;
moving each of the at least first and second light sensitive pixilated chips independently;
identifying a position where at least one pixel of the first light sensitive pixilated chip has a maximum probability of interacting with at least one high energy particle;
identifying a position where at least one pixel of the second light sensitive pixilated chip has a maximum probability of interacting with at least one high energy particle;
triangulating a position of a source of the at least one high energy particle using the identified positions of each of first and second light sensitive pixilated chips.

31. The method of claim 17, further comprising determining a brightness of the at least one pixel.

32. The method of claim 31, further comprising determining at least one of: a number of pixels that have interacted with the at least one high energy particle; an energy of the at least one high energy particle; a type of the source; or an amount of the source based on the brightness of the at least one pixel.

33. The method of claim 32, wherein the one or more light sensitive pixilated chips are completely covered, partially covered or reversibly covered.

\* \* \* \* \*